US012703070B2

(12) United States Patent
Damonte Vegas et al.

(10) Patent No.: US 12,703,070 B2
(45) Date of Patent: Aug. 11, 2026

(54) TORQUE SETTING INDICATION FOR POWER TOOL

(71) Applicant: MILWAUKEE ELECTRIC TOOL CORPORATION, Brookfield, WI (US)

(72) Inventors: Alejandro M. Damonte Vegas, Glendale, WI (US); Kyle T. Prosser, Jber, AK (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 107 days.

(21) Appl. No.: 18/664,646

(22) Filed: May 15, 2024

(65) Prior Publication Data

US 2024/0383114 A1 Nov. 21, 2024

Related U.S. Application Data

(60) Provisional application No. 63/509,024, filed on Jun. 19, 2023, provisional application No. 63/503,242, filed on May 19, 2023.

(51) Int. Cl.

| | |
|---|---|
| ***B25B 23/147*** | (2006.01) |
| ***B25B 23/14*** | (2006.01) |
| ***B25B 23/18*** | (2006.01) |

(52) U.S. Cl.
CPC .......... *B25B 23/1475* (2013.01); *B25B 23/18* (2013.01); *B25B 23/141* (2013.01)

(58) Field of Classification Search
CPC .... B25B 23/1475; B25B 23/18; B25B 23/141
See application file for complete search history.

(56) References Cited

U.S. PATENT DOCUMENTS

| | | | | |
|---|---|---|---|---|
| 11,213,933 | B2 * | 1/2022 | Kato | H02P 29/20 |
| 11,400,570 | B2 | 8/2022 | Thorson et al. | |
| 2014/0131059 | A1 * | 5/2014 | Verbrugge | B25F 5/00 173/217 |
| 2014/0284070 | A1 | 9/2014 | Ng et al. | |

(Continued)

FOREIGN PATENT DOCUMENTS

| | | |
|---|---|---|
| CN | 103223655 A | 7/2013 |
| CN | 208977690 U | 6/2019 |

(Continued)

OTHER PUBLICATIONS

Chinese Patent Office Action for Application No. 202421084988.X dated Feb. 10, 2025 (4 pages including statement of relevance).

(Continued)

*Primary Examiner* — Michelle Lopez
(74) *Attorney, Agent, or Firm* — Michael Best & Friedrich LLP

(57) ABSTRACT

A power tool including a housing with a motor housing portion, a front housing portion, a rear housing portion, and a handle portion extending from the motor housing portion. The power tool including a motor disposed within the motor housing portion. The power tool including a trigger located on a front side of the handle portion. The power tool including a torque adjustment interface for changing a torque setting of the power tool. The power tool including a torque setting indicator disposed on a side of the power tool and configured to indicate the torque setting of the power tool.

17 Claims, 32 Drawing Sheets

(56) References Cited

U.S. PATENT DOCUMENTS

| | | | | |
|---|---|---|---|---|
| 2015/0041164 | A1* | 2/2015 | Sergyeyenko | B25B 23/147 173/176 |
| 2016/0354888 | A1* | 12/2016 | Huber | B25F 5/001 |
| 2018/0331768 | A1 | 11/2018 | Szell | |
| 2023/0256580 | A1* | 8/2023 | Yang | B25F 5/02 173/93 |

FOREIGN PATENT DOCUMENTS

| | | | |
|---|---|---|---|
| EP | 3687024 | A1 | 7/2020 |
| WO | 2023049516 | A1 | 3/2023 |
| WO | 2023147592 | A1 | 8/2023 |

OTHER PUBLICATIONS

Extended European Search Report for Application No. 24176760.7 dated May 7, 2025 (8 pages).

* cited by examiner

10
Battery Pack
Battery Pack Interface
190
185
160
Power Input Unit
180
Motor
155
Switching Network
174
Secondary Sensors
172
Temperature Sensor(s)
150
Speed Sensor(s)
170
Current Sensor(s)
145
Indicator(s)
Output Units
135
Input Units
130
142
Memory
Program Storage
Data Storage
125
105
Trigger
28
Trigger Switch
158
Input Device
140
Controller
Processing Unit
Control Unit
Arithmetic Logic Unit ("ALU")
Registers
100
110
115
120

TORQUE SETTING INDICATION FOR POWER TOOL

RELATED APPLICATIONS

This application claims the benefit of U.S. Provisional Patent Application No. 63/503,242, filed May 19, 2023, and U.S. Provisional Patent Application No. 63/509,024, filed Jun. 19, 2023, the entire content of each of which is hereby incorporated by reference.

FIELD

This disclosure relates to a power tool.

SUMMARY

In one aspect, the present disclosure herein relates to a power tool including a housing including a motor housing portion, a front housing portion, a rear housing portion, and a handle portion extending from the motor housing portion. The power tool includes a motor disposed within the motor housing portion, a trigger located on a front side of the handle portion, and a torque adjustment for changing a torque setting of the power tool. The power tool further includes a torque setting indicator disposed on a side of the power tool and configured to indicate the torque setting of the power tool.

In another aspect, the present disclosure herein relates to a power tool including a housing including a motor housing portion, a front housing portion, a rear housing portion, and a handle portion extending from the motor housing portion. The power tool includes a motor disposed within the motor housing portion, a trigger located on a front side of the handle portion, and a torque adjustment interface disposed between the front housing portion and the trigger for changing a torque setting of the power tool. The power tool includes a torque setting indicator disposed on a side of the power tool and including a set of indicators configured to indicate the torque setting of the power tool. The power tool further includes a controller configured to control the motor and connected to the torque setting indicator.

In yet another aspect, the present disclosure described herein relates to a method of operating a power tool. The method includes indicating a torque setting of the power tool via a torque setting indicator disposed on a side of the power tool and alerting a user of a clutch out condition when an electronic clutch of the power tool is engaged.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other features and aspects of the disclosure will become apparent by consideration of the following detailed description and accompanying drawings.

DETAILED DESCRIPTION

Figure 1:
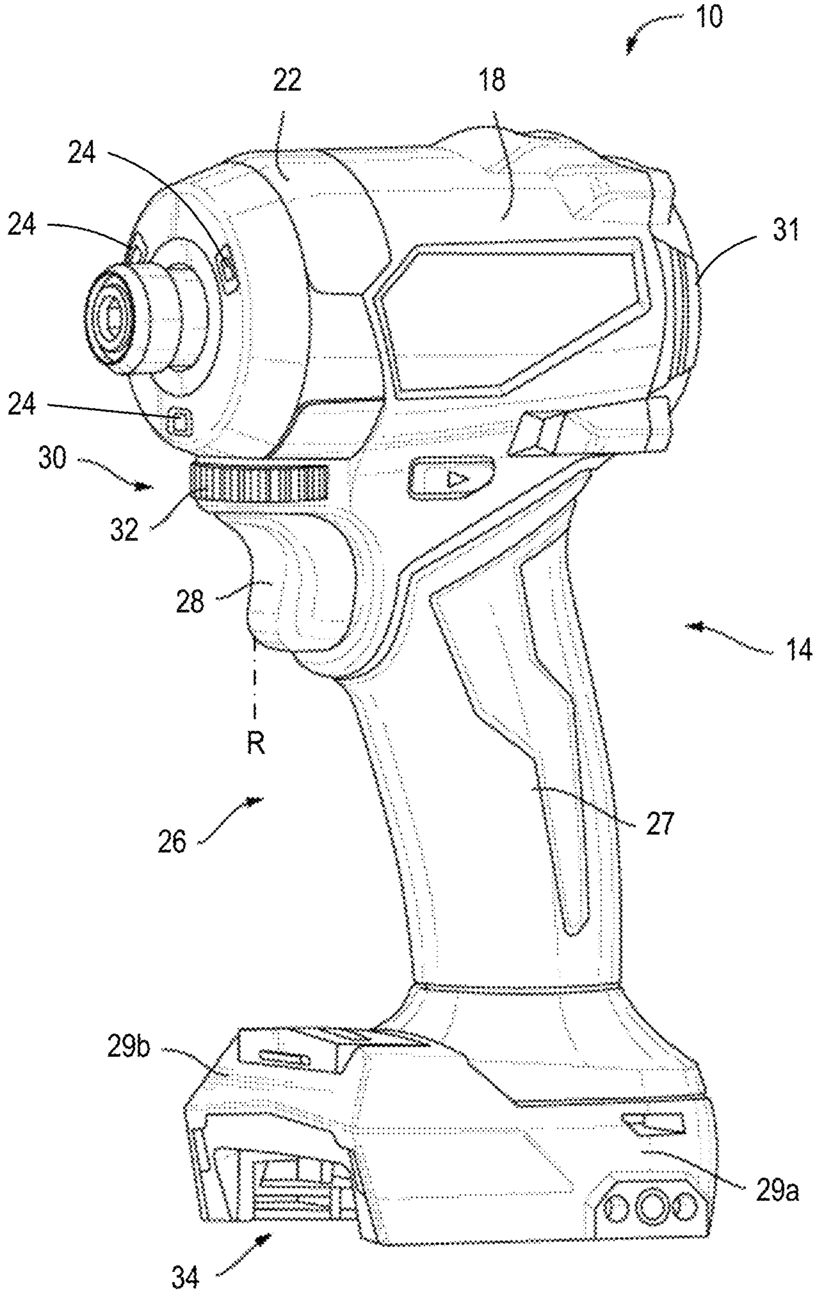
FIG. 1 perspective view of a power tool including a torque adjustment interface according to an embodiment of the present disclosure.

FIG. 1 illustrates a power tool 10 in the form of a rotary impact tool (e.g., an impact driver). The illustrated power tool 10 includes a housing 14 with a motor housing portion 18 enclosing a motor (e.g., a brushless DC motor; not shown), a front housing portion, or case, 22 coupled to the motor housing portion 18 (e.g., by a plurality of fasteners), a handle portion 26 extending downwardly from the motor housing portion 18, and a rear housing portion 31 coupled to the motor housing portion 18 (e.g., by a plurality of fasteners). In some embodiments, the rear housing portion 31 is integral to the motor housing portion 18. The handle portion 26 includes a grip 27 that can be grasped by a user. A trigger 28 is coupled to a front side of the handle portion 26 and can be actuated by the user to operate the power tool 10. In the illustrated embodiment, the handle portion 26 and the motor housing portion 18 are defined by cooperating clamshell halves 29*a*, 29*b*.

The power tool 10 has a battery receptacle 34 located at a bottom end of the handle portion 26. The battery receptacle 34 is configured to receive a battery pack (see FIG. 9), which provides power to the motor. In other embodiments, the power tool 10 may include a power cord for electrically connecting the power tool 10 to a source of AC power. As a further alternative, the power tool 10 may be configured to operate using a different power source (e.g., a pneumatic power source, etc.).

Figure 2:
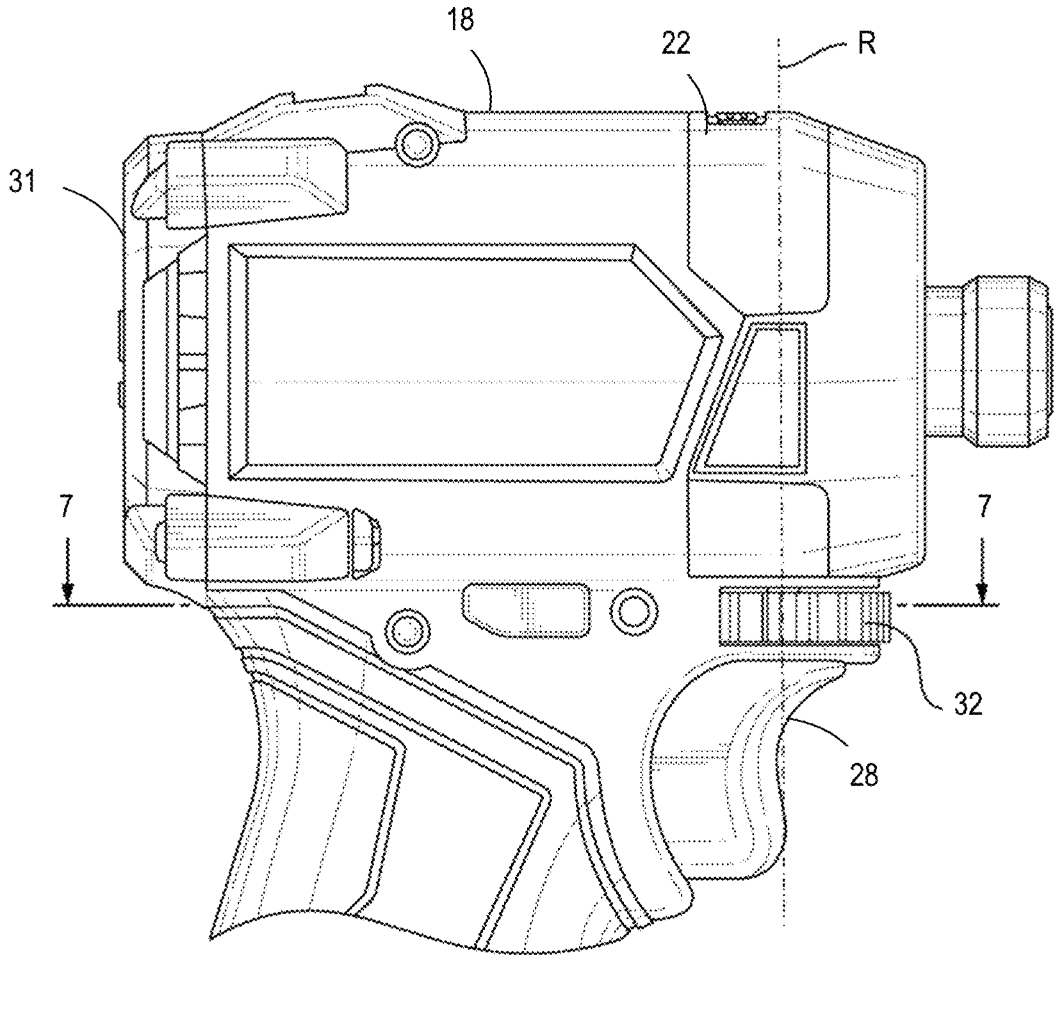
FIG. 2 is an enlarged side view of the power tool of FIG. 1.

The power tool 10 includes an electronically-controlled clutch mechanism configured to receive an electronic torque setting and electronically (e.g., via motor control) and/or mechanically (e.g., via an adjustable slip condition of the clutch mechanism) limit the torque output of the power tool 10 based on the torque setting. In the illustrated embodiment, the power tool 10 includes a torque adjustment interface in the form of a rotary actuator or dial assembly 32. For example, the dial assembly 32 is located at least partially within a chin portion 30 of the power tool 10, defined between the front housing portion and the trigger 28. The dial assembly 32 includes one or more components that are rotatable about a rotational axis R to adjust the torque setting of the power tool 10. In the illustrated embodiment, the rotational axis R intersects the front housing portion 22 and the trigger 28. As illustrated in FIGS. 1 and 2, the dial assembly 32 is accessible from both lateral sides, as well as the front of the power tool 10. This allows the user to rotate the dial assembly 32 about a rotational axis R (e.g., using the user's index finger) while grasping the grip 27 of the power tool 10 with the same hand, thus facilitating one-handed, ambidextrous operation of the power tool 10. The power tool 10 may include a set of indicators 24 (e.g., LEDs) that illuminate a work surface in one aspect. The set of indicators 24 may be shadowless lights. It is further contemplated that the set of indicators 24 change color or flash in various patterns that are associated with the torque setting (further described herein).

Figure 3:
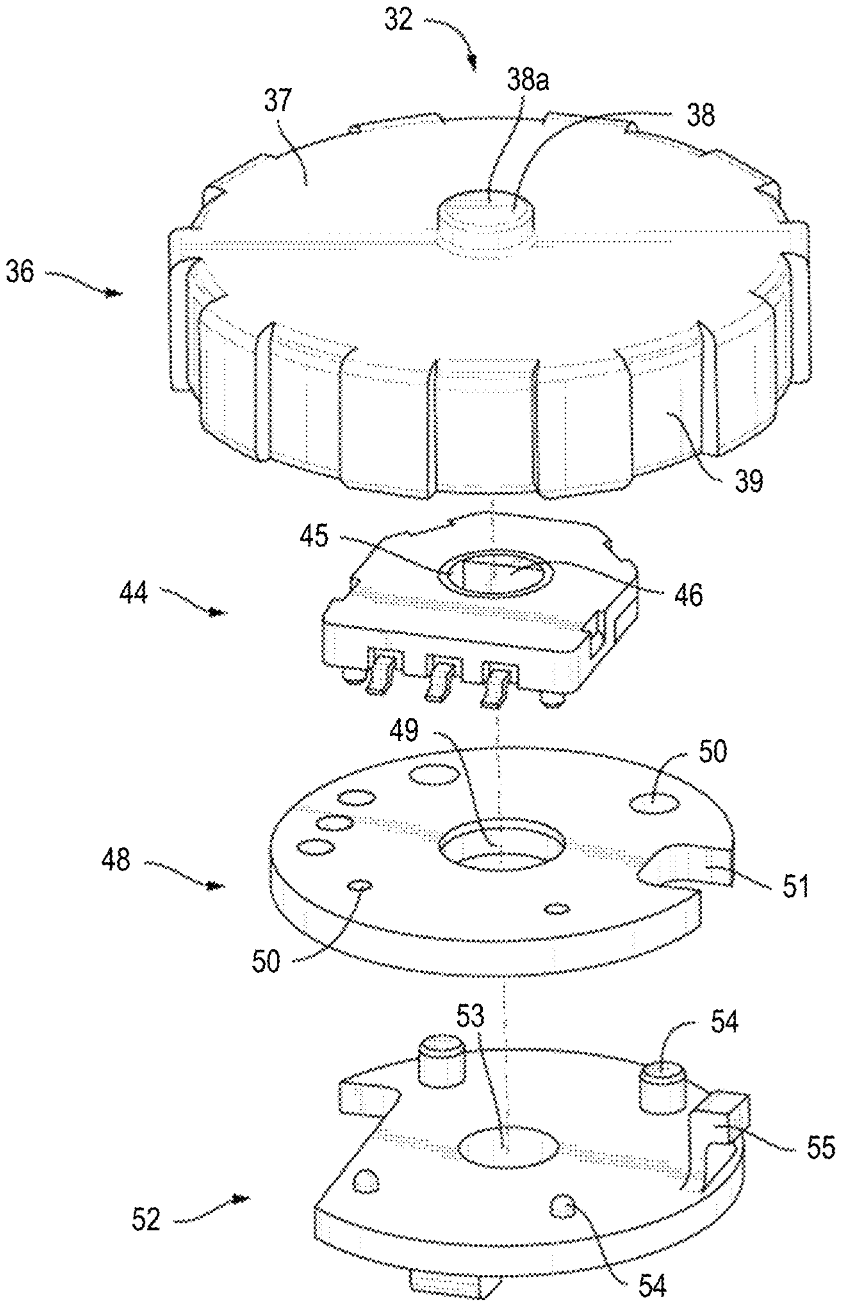
FIG. 3 is an exploded view of a dial of the torque adjustment interface of FIG. 1.
Figure 4:
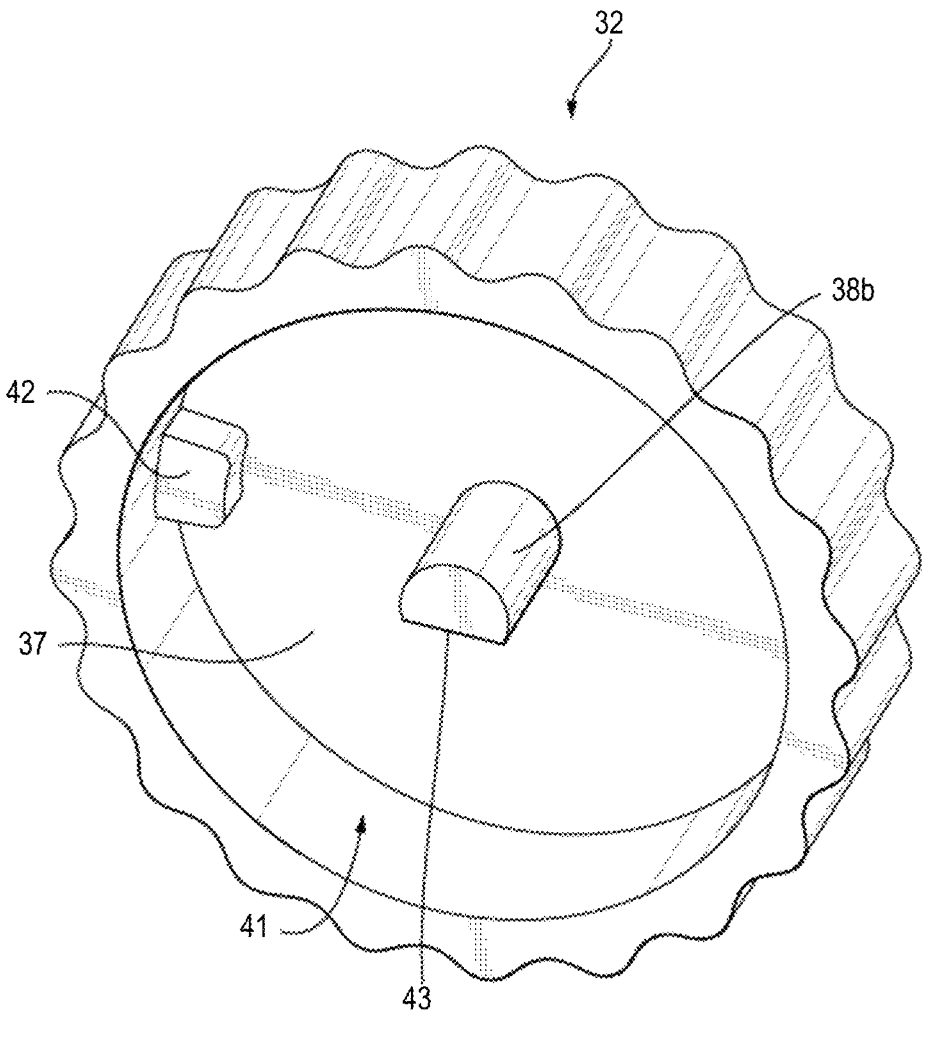
FIG. 4 is a perspective view of the dial of FIG. 3.

As illustrated in FIGS. 3 and 4, the dial assembly 32 includes a dial case 36, a potentiometer 44, a circuit board 48, and a support 52. The dial case 36 includes a top wall 37, a central post 38 extending through the top wall 37, and an outer wall 39. A cavity 41 is defined by the top wall 37 and the outer wall 39, and a block 42 projects from the top wall 37 and the outer wall 39 into the cavity 41. The central post 38 includes a first portion 38*a* extending from a top surface of the dial case 36 and a second portion 38*b* extending from a bottom surface of the dial case 36. The first portion 38*a* is cylindrical in shape, and the second portion 38*b* is largely cylindrical with a flat side 43. The second portion 38*b* extends through a central aperture 45 of the potentiometer 44 and a central aperture 49 of the circuit board 48 and is received by a central recess 53 of the support 52. The central aperture 49 of the circuit board 48 and the central recess 53 of the support 52 are cylindrical, and the central aperture 45 of the potentiometer 44 is cylindrical with a flat side 46. The support 52 includes a plurality of bosses 54 and a stop tab 55 extending from a top surface of the support 52. The plurality of bosses 54 are received by apertures 50 in the circuit board 48 to secure the circuit board 48 to the support 52. The stop tab 55 extends through a cutout 51 in the circuit board 48.

Figure 5:
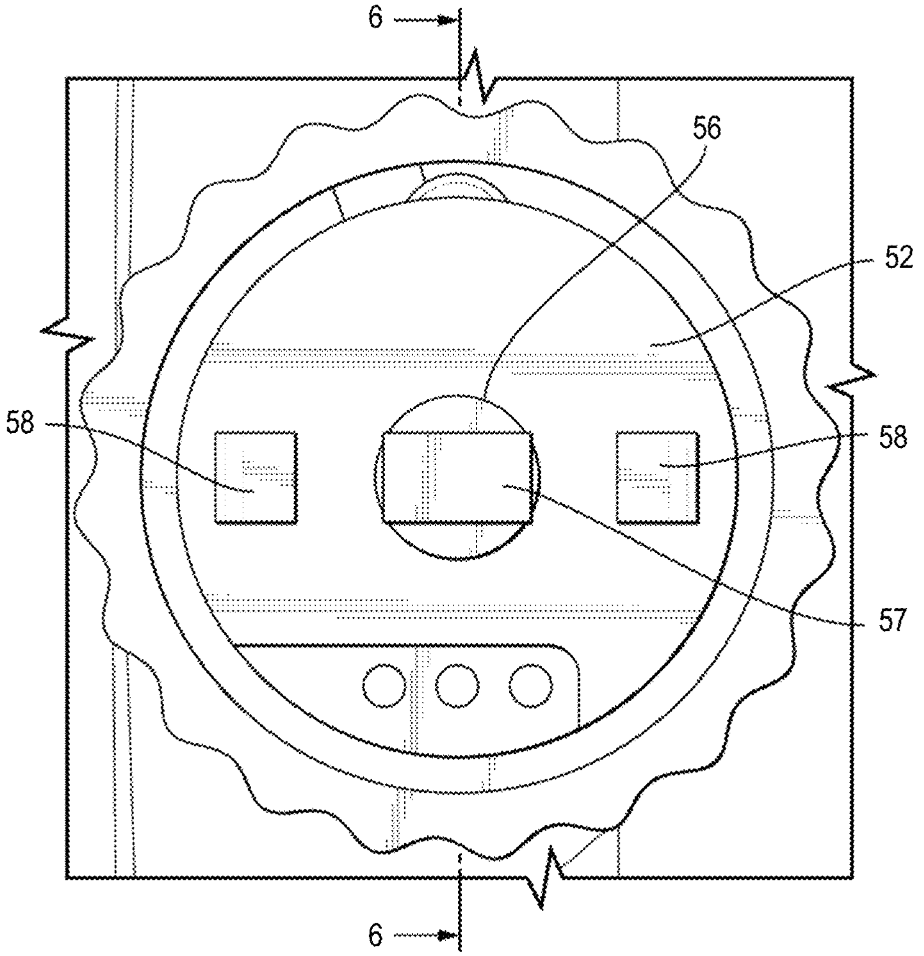
FIG. 5 is a side view of the dial of FIG. 3.
Figure 6:
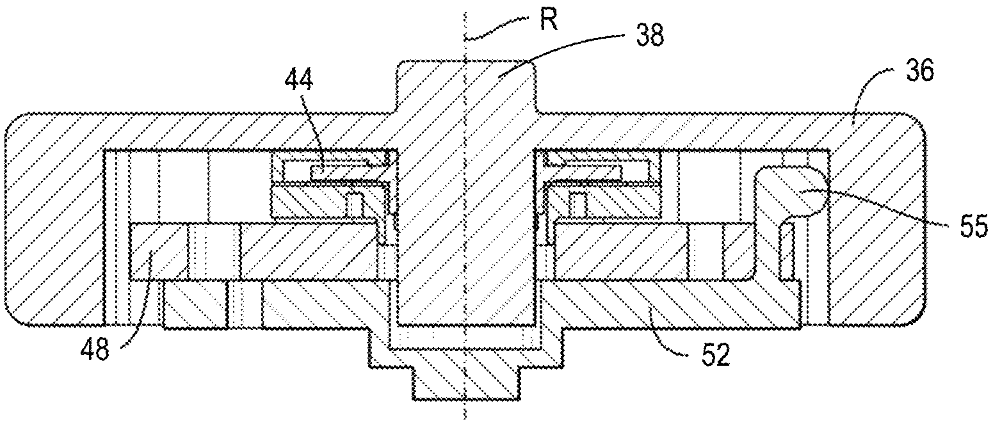
FIG. 6 a side cross-sectional view of the dial taken along a line 6-6 in FIG. 5.

As illustrated in FIGS. 5 and 6, the support 52 further includes a cylindrical protrusion 56 extending from a bottom side of the support 52. The central recess 53 extends into the cylindrical protrusion 56. A central block 57 projects from the cylindrical protrusion 56 and lateral blocks 58 project from a bottom side of the support 52. The cylindrical protrusion 56, central block 57, and lateral blocks 58 are received by similarly shaped recesses formed by the cooperating clamshell halves 29*a*, 29*b*, and operate to secure the support 52 and prevent the support 52 from rotating when the dial case 36 rotates.

Referring to FIG. 6, the circuit board 48 and the potentiometer 44 are each accommodated within the interior of the dial case 36. The support 52 is also at least partially accommodated within the dial case 36. This provides the dial assembly 32 with a compact overall height in the direction of the rotational axis R, allowing the dial assembly 32 to fit within the limited available space at the chin portion 30 while maximizing the available surface area of the dial case 36 to facilitate manipulation by the user. In some embodiments, the dial assembly 32 has an overall height along the rotational axis R between 5 millimeters and 8 millimeters, or between 6 millimeters and 7 millimeters in some embodiments.

During operation, the user rotates the dial case 36 about the rotational axis R. The second portion 38*b* and the central aperture 45 of the potentiometer 44 are shaped similarly, such that the flat side 43 of the second portion 38*b* contacts the flat side 46 of the potentiometer 44 to cause the potentiometer 44 to rotate with the dial case 36. As the potentiometer 44 rotates, it sends electronic signals to a control system to adjust a torque setting of the power tool 10. The circuit board 48 and the support 52 remain stationary as the dial case 36 rotates. The block 42 is configured to contact the stop tab 55, which prevents the dial case 36 from rotating in a full revolution. As such, the dial case 36 is rotatable at an angle less than 360 degrees. When the dial case 36 is rotated such that a first side of the block 42 contacts a first side of the stop tab 55, the torque setting will be at a maximum, and when the dial case 36 is rotated such that a second side of the block 42 opposite the first side of the block 42 contacts a second side of the stop tab 55 opposite the first side of the stop tab 55, the torque setting will be at a maximum. In some embodiments, there may not be a block, which will allow the dial case 36 to freely revolve about the rotational axis R.

Figure 7:
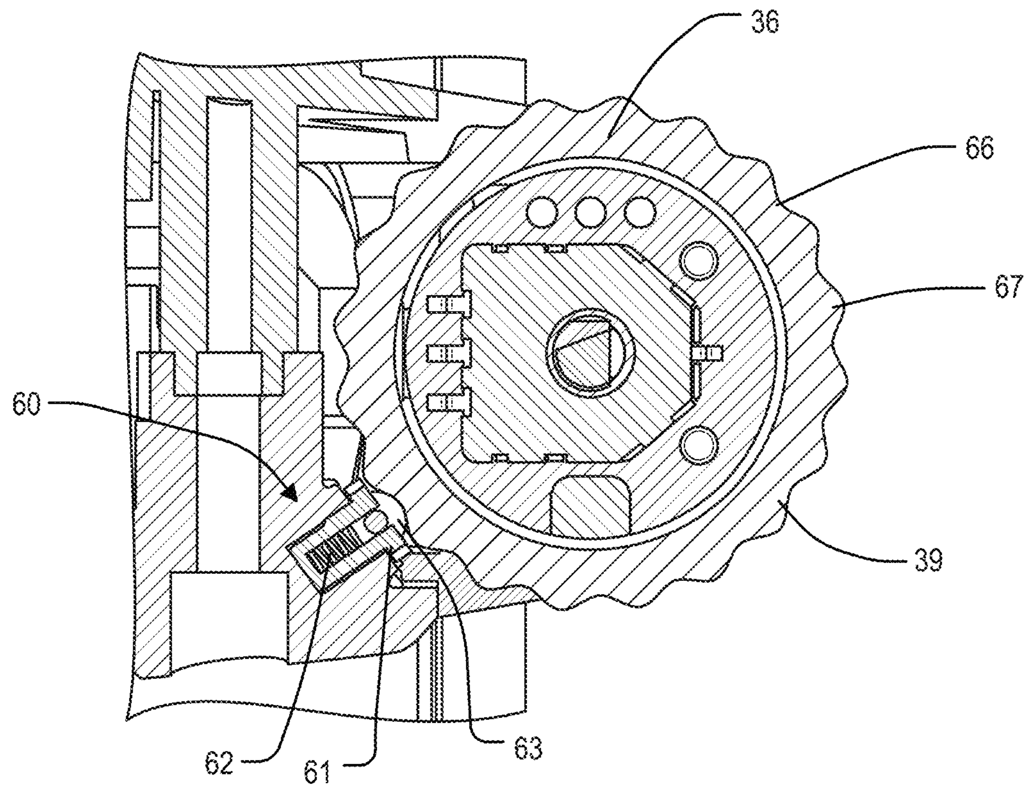
FIG. 7 is an enlarged cross-sectional view of the impact tool taken along a line 7-7 in FIG. 2.
Figure 8:
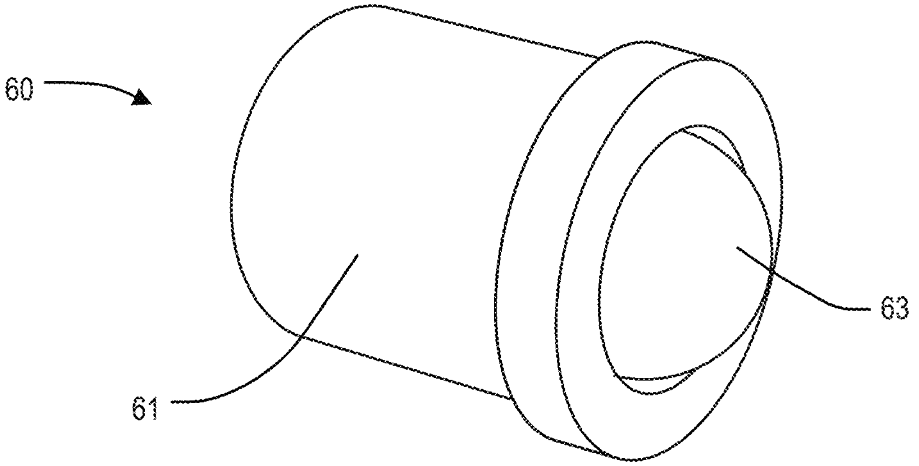
FIG. 8 is a perspective view of a detent illustrated in FIG. 7.

As illustrated in FIGS. 7 and 8, the outer wall 39 of the dial case 36 is contacted by a detent mechanism 60. The detent mechanism 60 includes a detent housing 61, a biasing member 62 (e.g., a spring) within the detent housing 61, and a ball 63 supported by the detent housing 61 and biased by the biasing member 62. The ball 63 is in contact with the outer wall 39 and is pushed into the detent housing 61 against the bias of the biasing member 62 by the outer wall 39. As the dial case 36 is rotated, the ball 63 is pushed different distances into the detent housing 61. For example, the ball 63 is pushed into the detent housing 61 a first distance when the ball 63 is in contact with one of a plurality of trough portions 66 on the outer wall 39, and the ball 63 is pushed into the detent housing 61 a second distance greater than the first distance when the when the ball 63 is in contact with one of a plurality of ridge portions 67 on the outer wall 39. Thus, to rotate the dial case 36 from one of the plurality of trough portions 66 to another of the plurality of trough portions 66, the user must overcome the force required to push the ball 63 against the bias of the biasing member 62 the distance between the second distance and the first distance. The ball 63 is configured to remain at rest in the trough portions 66, and the trough portions 66 may correspond to a specific torque setting. Rotation of the dial case 36 against the bias of the biasing member 62 may also provide tactile feedback. This will alert the user the torque setting has been switched from one level to another. The torque setting may also be indicated by a display, lights, or the like. In some embodiments, there may be a plurality of LED's used to display the torque setting.

Figure 9:
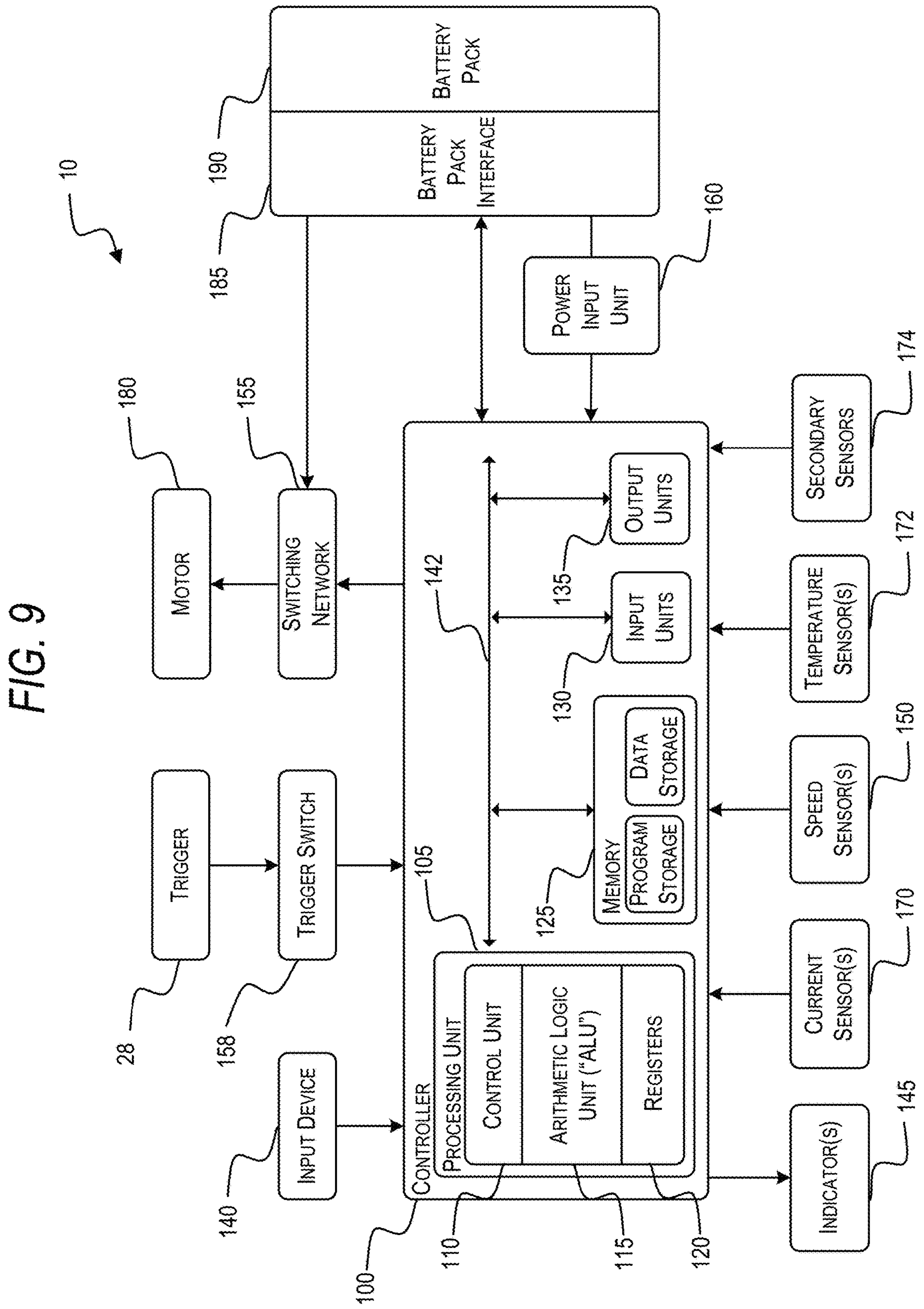
FIG. 9 illustrates a block diagram of a controller for the power tool of FIG. 1 in accordance with embodiments described herein.

A controller 100 for the power tool 10 is illustrated in FIG. 9. The controller 100 is electrically and/or communicatively connected to a variety of modules or components of the power tool 10. For example, the illustrated controller 100 is connected to indicators 145, a current sensor 170, a speed sensor 150, a temperature sensor 172, secondary sensor(s) 174 (e.g., a voltage sensor, an accelerometer, a torque sensor or torque transducer, etc.), the trigger 28 (via a trigger switch 158), a power switching network 155, and a power input unit 160.

The controller 100 includes a plurality of electrical and electronic components that provide power, operational control, and protection to the components and modules within the controller 100 and/or power tool 10. For example, the controller 100 includes, among other things, a processing unit 105 (e.g., a microprocessor, an electronic processor, an electronic controller, a microcontroller, or another suitable programmable device), a memory 125, input units 130, and output units 135. The processing unit 105 includes, among other things, a control unit 110, an arithmetic logic unit ("ALU") 115, and a plurality of registers 120 (shown as a group of registers in FIG. 9), and is implemented using a known computer architecture (e.g., a modified Harvard architecture, a von Neumann architecture, etc.). The processing unit 105, the memory 125, the input units 130, and the output units 135, as well as the various modules connected to the controller 100 are connected by one or more control and/or data buses (e.g., common bus 142). The control and/or data buses are shown generally in FIG. 9 for illustrative purposes. The use of one or more control and/or data buses for the interconnection between and communication among the various modules and components would be known to a person skilled in the art in view of the embodiments described herein.

The memory 125 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 105 is connected to the memory 125 and executes software instructions that are capable of being stored in a RAM of the memory 125 (e.g., during execution), a ROM of the memory 125 (e.g., on a generally permanent basis), or another non-transitory computer readable medium such as another memory or a disc. Software included in the implementation of the power tool 10 can be stored in the memory 125 of the controller 100. The software includes, for example, firmware, one or more applications, program data, filters, rules, one or more program modules, and other executable instructions. The controller 100 is configured to retrieve from the memory 125 and execute, among other things, instructions related to the control processes and methods described herein. In other embodiments, the controller 100 includes additional, fewer, or different components.

The controller 100 drives the motor 180 to rotate a driver in response to a user's actuation of the trigger 28. The driver may be coupled to the motor 180 via an output shaft. Depression of the trigger 28 actuates a trigger switch 158, which outputs a signal to the controller 100 to drive the motor 180, and therefore the driver. In some embodiments, the controller 100 controls the power switching network 155 (e.g., a FET switching bridge) to drive the motor 180. For example, the power switching network 155 may include a plurality of high side switching elements (e.g., FETs) and a plurality of low side switching elements. The controller 100 may control each FET of the plurality of high side switching elements and the plurality of low side switching elements to drive each phase of the motor 180. For example, the power switching network 155 may be controlled to more quickly deaccelerate the motor 180. In some embodiments, the controller 100 monitors a rotation of the motor 180 (e.g., a rotational rate of the motor 180, a velocity of the motor 180, a position of the motor 180, and the like) via the speed sensor 150. The motor 2180 may be configured to drive a gearbox (e.g., a mechanism). In some embodiments, the controller 100 is configured to implement an electronic clutch. For example, the controller 100 is configured to monitor a current, speed, and/or torque associated with the motor 180. When the monitored current, speed, and/or torque associated with the motor 180 satisfies a threshold value, the controller 100 implements or activates an electronic clutch to reduce or stop operation of the motor 180 (e.g., current to the motor 180 is partially or fully interrupted).

The indicators 145 are also connected to the controller 100 and receive control signals from the controller 100 to turn on and off or otherwise convey information based on different states of the power tool 10. The indicators 145 include, for example, one or more light-emitting diodes (LEDs), or a display screen. The indicators 145 can be configured to display conditions of, or information associated with, the power tool 10. For example, the indicators 145 can display information relating to an operational state of the power tool 10, such as a mode or speed setting. The indicators 145 may also display information relating to a fault condition, or other abnormality of the power tool 10. In addition to or in place of visual indicators, the indicators 145 may also include a speaker or a tactile feedback mechanism to convey information to a user through audible or tactile outputs. In some embodiments, the indicators 145 display information related to a braking operation or a clutch operation (e.g., an electronic clutch operation) of the controller 100. For example, one or more LEDs are activated when the controller 100 is performing a clutch operation.

A battery pack interface 185 is connected to the controller 100 and is configured to couple with a battery pack 190. The battery pack interface 185 includes a combination of mechanical (e.g., a battery pack receiving portion) and electrical components configured to and operable for interfacing (e.g., mechanically, electrically, and communicatively connecting) the power tool 10 with the battery pack 190. The battery pack interface 185 is coupled to the power input unit 160. The battery pack interface 185 transmits the power received from the battery pack 190 to the power input unit 160. The power input unit 160 includes active and/or passive components (e.g., voltage step-down controllers, voltage converters, rectifiers, filters, etc.) to regulate or control the power received through the battery pack interface 185 and to the controller 100. In some embodiments, the battery pack interface 185 is also coupled to the power switching network 155. The operation of the power switching network 155, as controlled by the controller 100, determines how power is supplied to the motor 180.

The current sensor 170 senses a current provided by the battery pack 190, a current associated with the motor 180, or a combination thereof. In some embodiments, the current sensor 170 senses at least one of the phase currents of the motor. The current sensor 170 may be, for example, an inline phase current sensor, a pulse-width-modulation-center-sampled inverter bus current sensor, or the like. The speed sensor 150 senses a speed of the motor 180. The speed sensor 150 may include, for example, one or more Hall effect sensors. In some embodiments, the temperature sensor 172 senses a temperature of the switching network 155, the battery pack 190, the motor 180, or a combination thereof. The input device 140 is operably coupled to the controller 100 to, for example, select a forward mode of operation, a reverse mode of operation, a torque setting for the power tool 10, and/or a speed setting for the power tool 10 (e.g., using torque and/or speed switches), etc. In some embodiments, the input device 140 includes a combination of digital and analog input or output devices required to achieve a desired level of operation for the power tool 10, such as one or more knobs, one or more dials, one or more switches, one or more buttons, etc. In other embodiments, the input device 140 is configured as a ring (e.g., torque ring) or the torque adjustment interface (e.g., the dial assembly 32). Control of the input device 140 sets a desired torque and/or desired a speed value at which to drive the motor 180.

The power tool 10 can include a variety of different types of indicators to indicate, for example, different torque settings for the power tool 10 that are set using the torque adjustment interface. In some embodiments, a torque setting indicator can be located on an upper or top portion of the power tool 10. In some embodiments, the torque setting indicator can be located on a side portion (e.g., a rear side portion) of the power tool 10.

Figure 10:
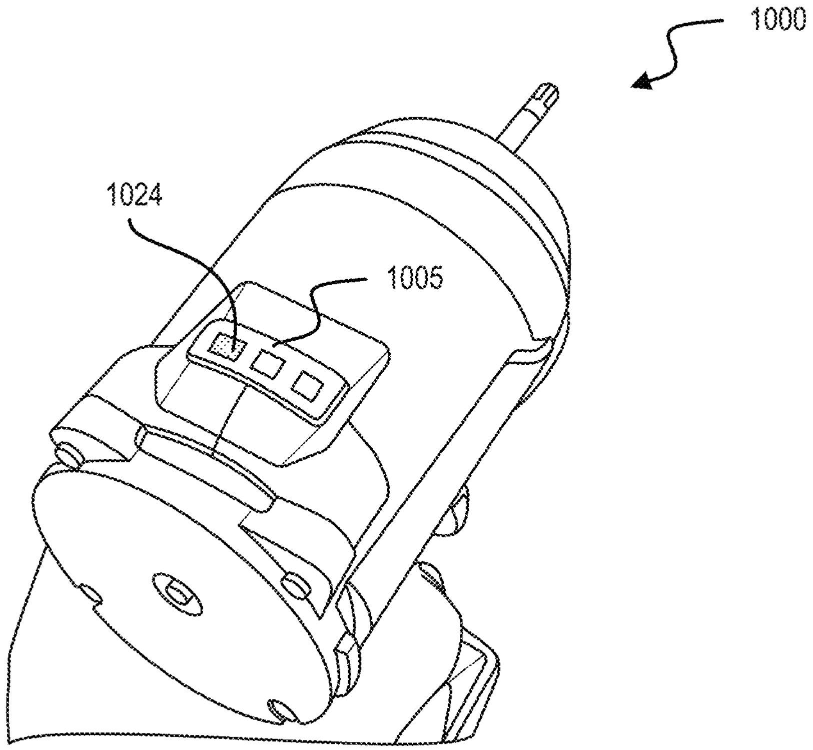
FIG. 10 illustrates a torque setting indication interface, according to embodiments described herein.

FIG. 10 illustrates an embodiment 1000 of the power tool 10 that includes a torque setting indicator 1005 on an upper or top portion (e.g., of the motor housing portion 18 of FIG. 1) of the power tool 1000. The torque setting indicator 1005 includes a set of indicators 1024 (e.g., a plurality of light emitting devices [e.g., LEDs]) that can be illuminated to indicate a torque setting that is set with the torque adjustment interface. In some embodiments, the light emitting devices can change color (e.g., red, blue, green, etc.) to convey an operational state or setting for the power tool 1000. Additionally, the more light emitting devices that are illuminated can indicate, for example, a higher torque setting for the power tool 1000.

Figure 11:
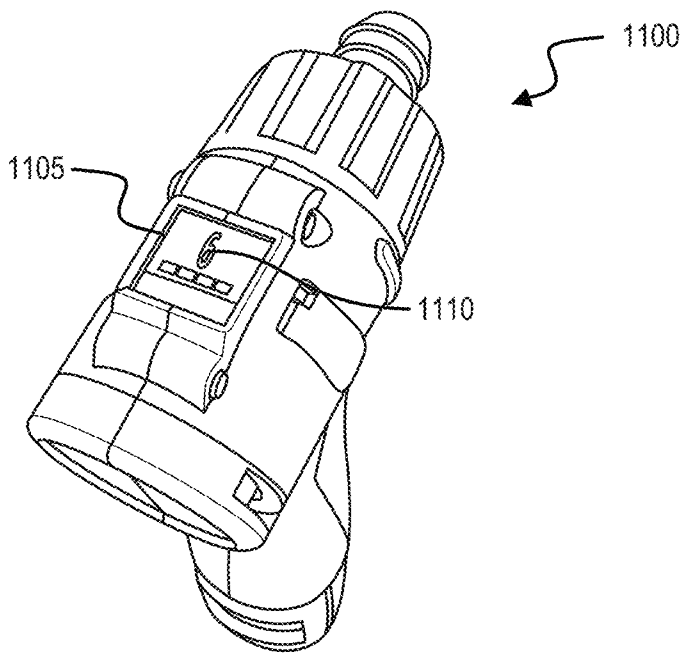
FIG. 11 illustrates a torque setting indication interface, according to embodiments described herein.
Figure 12:
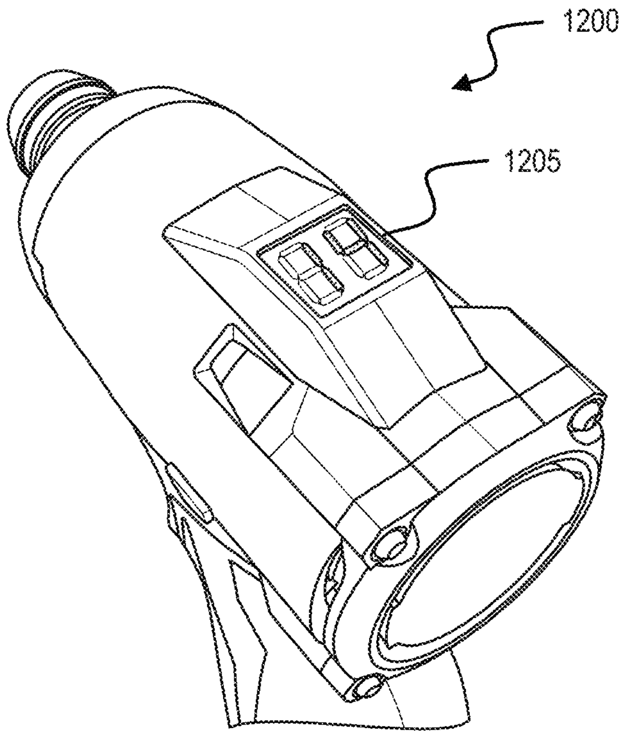
FIG. 12 illustrates a torque setting indication interface, according to embodiments described herein.

FIGS. 11 and 12 illustrate additional examples of torque setting indicators of the power tool 10. FIG. 11 illustrates an embodiment 1100 of the power tool 10 that includes a torque setting indicator 1105 on an upper or top portion of the power tool 1100. In the illustrated embodiment, the torque setting indicator 1105 includes a numerical representation of a torque setting that can be set, for example, using the torque adjustment interface (e.g., numerically between 0 and 10). The torque setting indicator can similarly include a display of battery state-of-charge by illuminating one or more segments of a fuel gauge (e.g., four segments illuminated being a full battery pack charge). In the illustrated example, the torque setting indicator 1105 can include a liquid crystal display or other similar display to display the torque setting and/or a battery pack state-of-charge.

FIG. 12 illustrates an embodiment 1200 of the power tool 10 that includes a torque setting indicator 1205 on an upper or top portion of the power tool 1200. In the illustrated embodiment, the torque setting indicator 1205 includes a numerical representation of a torque setting that can be set, for example, using the torque adjustment interface (e.g., numerically between 0 and 100). In the illustrated example, the torque setting indicator 1205 includes a multiple digit seven-segment display. The digits of the seven-segment display can be illuminated to indicate the torque setting that is set using the torque adjustment interface.

Figure 13:
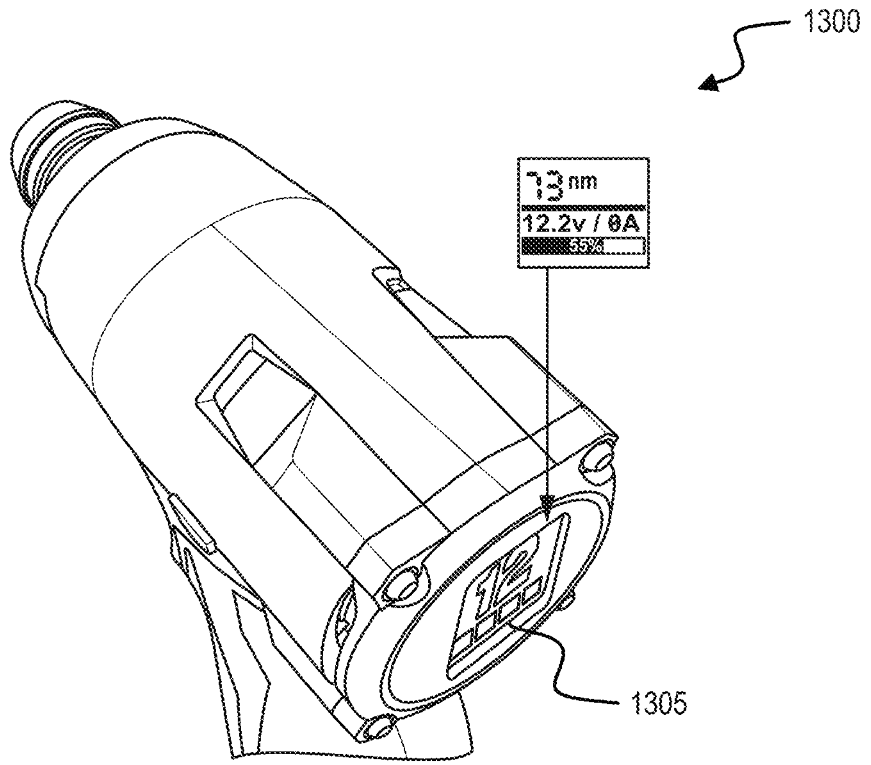
FIG. 13 illustrates a torque setting indication interface, according to embodiments described herein.
Figure 14:
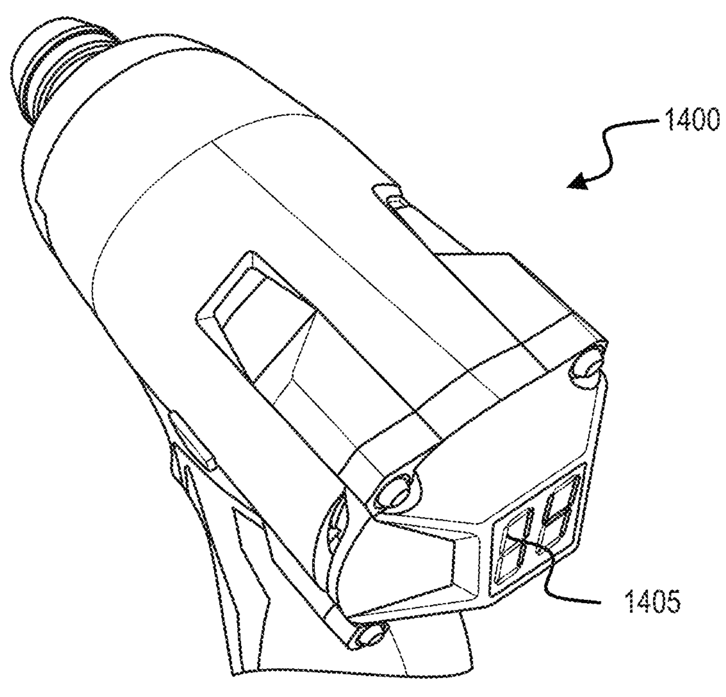
FIG. 14 illustrates a torque setting indication interface, according to embodiments described herein.

FIGS. 13 and 14 illustrate additional examples of torque setting indicators of the power tool 10. FIG. 13 illustrates an embodiment 1300 of the power tool 10 that includes a torque setting indicator 1305 on a side portion (e.g., the rear housing portion 31 of FIG. 1) of the power tool 1300. In the illustrated embodiment, the torque setting indicator 1305 includes a numerical representation of a torque setting that can be set, for example, using the torque adjustment interface (e.g., numerically between 0 and 100). The torque setting indicator can similarly include a display of battery state-of-charge by illuminating one or more segments of a fuel gauge (e.g., four segments illuminated being a full battery pack charge). In the illustrated example, the torque setting indicator 1305 can include a liquid crystal display or other similar display to display the torque setting and/or battery pack state-of-charge.

FIG. 14 illustrates an embodiment 1400 of the power tool 10 that includes a torque setting indicator 1405 on a side portion (e.g., the rear housing portion 31 of FIG. 1) of the power tool 1400. In the illustrated embodiment, the torque setting indicator 1405 includes a numerical representation of a torque setting that can be set, for example, using the torque adjustment interface (e.g., numerically between 0 and 100). In the illustrated example, the torque setting indicator 1405 includes a multiple digit seven-segment display. The digits of the seven-segment display can be illuminated to indicate the torque setting that is set using the torque adjustment interface.

Figure 15:
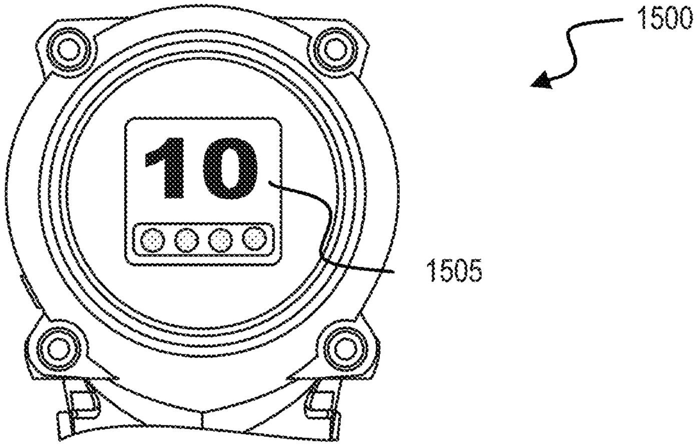
FIG. 15 illustrates a torque setting indication interface, according to embodiments described herein.

FIG. 15 illustrates an embodiment 1500 of the power tool 10 that includes a torque setting indicator 1505. Although the torque setting indicator 1505 is illustrated on a side portion (e.g., the rear housing portion 31 of FIG. 1) of the power tool 1500, the torque setting indicator could alternatively or additionally be located on an upper or top portion of the power tool 1500.

FIGS. 16-24 illustrate variations of the torque setting indicator 1505 that can be included in the power tool 1500.

Figure 16:
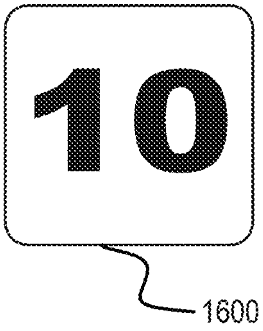
FIGS. 16-24 illustrates a torque setting indication interface, according to embodiments described herein.

FIG. 16 illustrates a torque setting indicator 1600 for the power tool 1500 that only includes a numerical display of a torque setting (e.g., numerically between 0 and 100).

Figure 17:
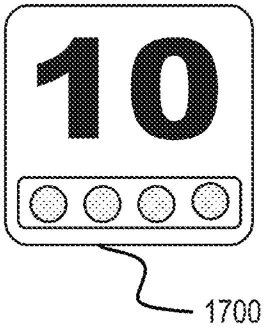

FIG. 17 illustrates a torque setting indicator 1700 for the power tool 1500 that includes a numerical display of a torque setting (e.g., numerically between 0 and 100) as well as a fuel gauge for a battery pack. The fuel gauge for the battery pack includes four LEDs that can be illuminated to show the present state-of-charge of the battery pack.

Figure 18:
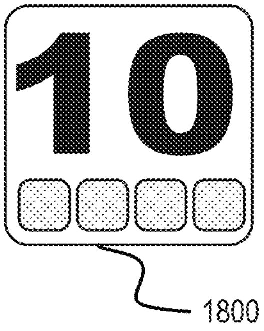

FIG. 18 illustrates a torque setting indicator 1800 for the power tool 1500 that includes a numerical display of a torque setting (e.g., numerically between 0 and 100) as well as a fuel gauge for a battery pack. The fuel gauge for the battery pack includes four back-lit LED portions that can be illuminated to show the present state-of-charge of the battery pack.

Figure 19:
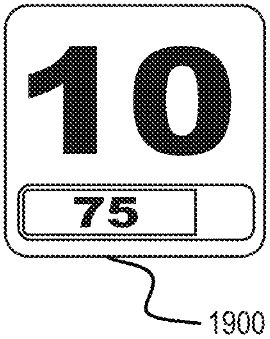

FIG. 19 illustrates a torque setting indicator 1900 for the power tool 1500 that includes a numerical display of a torque setting (e.g., numerically between 0 and 100) as well as a fuel gauge for a battery pack. The fuel gauge for the battery pack includes a numerical representation of the battery pack state-of-charge (e.g., between 0% and 100%) as well as an illumination bar that is illuminated in correspondence with the battery pack state-of-charge (e.g., 75% illuminated).

Figure 20:
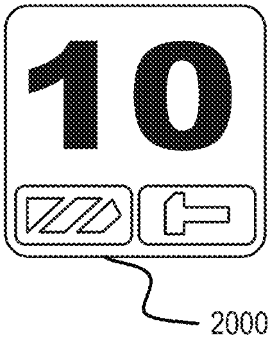

FIG. 20 illustrates a torque setting indicator 2000 for the power tool 1500 that includes a numerical display of a torque setting (e.g., numerically between 0 and 100) as well as one or more mode settings (e.g., hammer mode, tightening mode, etc.).

Figure 21:
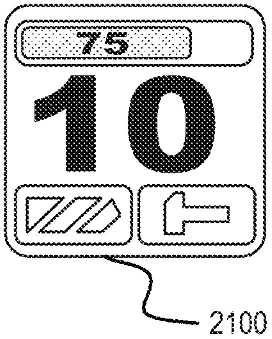

FIG. 21 illustrates a torque setting indicator 2100 for the power tool 1500 that includes a numerical display of a torque setting (e.g., numerically between 0 and 100) as well as one or more mode settings (e.g., hammer mode, tightening mode, etc.) and a fuel gauge for a battery pack. The fuel gauge for the battery pack includes a numerical representation of the battery pack state-of-charge (e.g., between 0% and 100%) as well as an illumination bar that is illuminated in correspondence with the battery pack state-of-charge (e.g., 75% illuminated).

Figure 22:
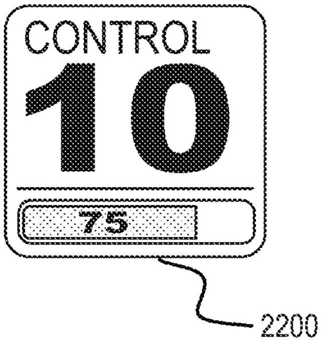

FIG. 22 illustrates a torque setting indicator 2200 for the power tool 1500 that includes a numerical display of a torque setting (e.g., numerically between 0 and 100) as well as a fuel gauge for a battery pack. The fuel gauge for the battery pack includes a numerical representation of the battery pack state-of-charge (e.g., between 0% and 100%) as well as an illumination bar that is illuminated in correspondence with the battery pack state-of-charge (e.g., 75% illuminated). In the illustrated embodiment, an indication of the type of torque setting is also provided (e.g., a control mode where greater control is provided to the user).

Figure 23:
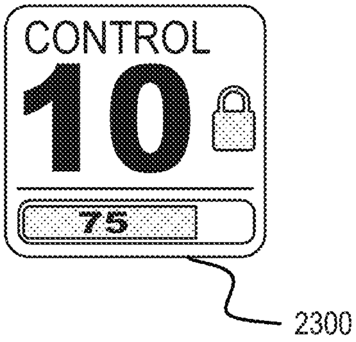

FIG. 23 illustrates a torque setting indicator 2300 for the power tool 1500 that includes a numerical display of a torque setting (e.g., numerically between 0 and 100) as well as a fuel gauge for a battery pack. The fuel gauge for the battery pack includes a numerical representation of the battery pack state-of-charge (e.g., between 0% and 100%) as well as an illumination bar that is illuminated in correspondence with the battery pack state-of-charge (e.g., 75% illuminated). In the illustrated embodiment, an indication of the type of torque setting is also provided (e.g., a control mode where greater control is provided to the user). The torque setting indicator 2300 can also include a lock indicator that indicates that, for example, the power tool 1500 is in a locked state or that the torque setting cannot currently be modified.

Figure 24:
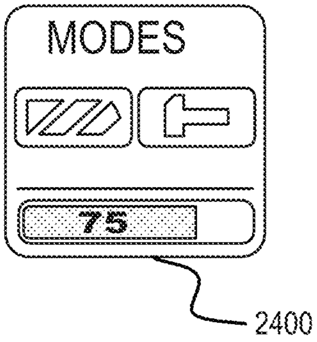

FIG. 24 illustrates an additional or alternative indicator 2400 that illustrates a fuel gauge for the battery pack includes a numerical representation of the battery pack state-of-charge (e.g., between 0% and 100%) as well as an illumination bar that is illuminated in correspondence with the battery pack state-of-charge (e.g., 75% illuminated), and one or more mode settings (e.g., hammer mode, tightening mode, etc.).

Figure 25:
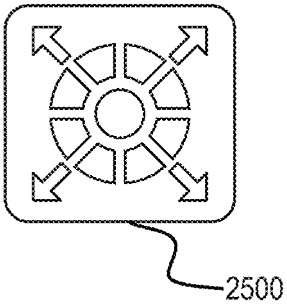
FIG. 25 illustrates a torque setting indication interface, according to embodiments described herein.

FIG. 25 illustrates a torque setting indicator 2500 that indicates a clutch out indication (e.g., an electronic clutch is engaged, a torque setting for a clutch has been met and/or exceeded, etc.).

Figure 26:
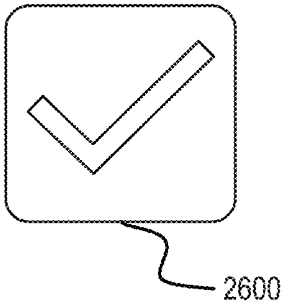
FIG. 26 illustrates a torque setting indication interface, according to embodiments described herein.

FIG. 26 illustrates a torque setting indicator 2600 that indicates when a clutch out condition has been cleared (e.g., a check mark indicates that the electronic clutch is no longer engaged, the torque setting for the clutch is no longer met or exceeded, etc.).

Figure 27:
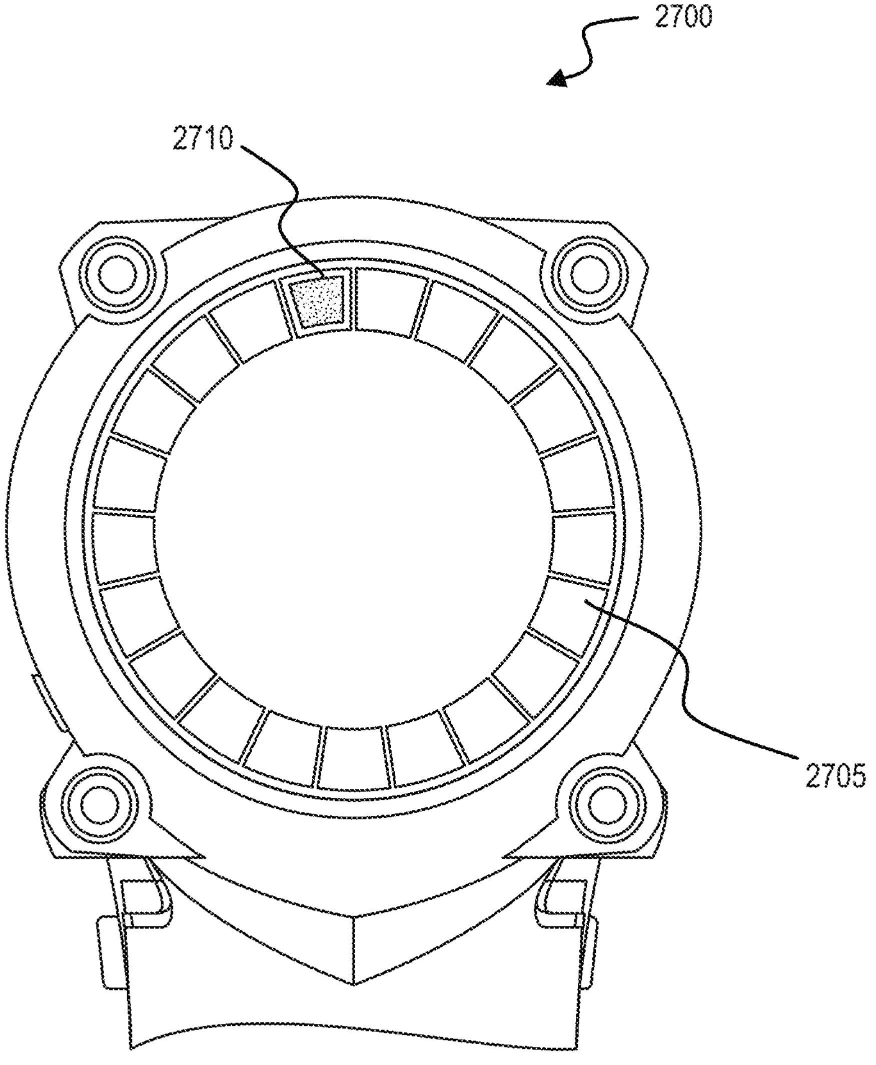
FIG. 27 illustrates a torque setting indication interface, according to embodiments described herein.

FIG. 27 illustrates an embodiment 2700 of the power tool 10 that includes a torque setting indicator 2705 on a side portion (e.g., the rear housing portion 31 of FIG. 1) of the power tool 2700. The torque setting indicator is formed as a ring (e.g., an LED ring). The torque setting indicator can illuminate different segments of the torque setting indicator to indicate a torque setting for the power tool 2700. A torque setting 2710 for the power tool 2700 is provided by the illuminated segment of the torque setting indicator 2705. In the illustrated embodiment, the torque setting is a low value (e.g., 1 of 21). In the illustrated embodiment, no numerical representations are provided.

Figure 28:
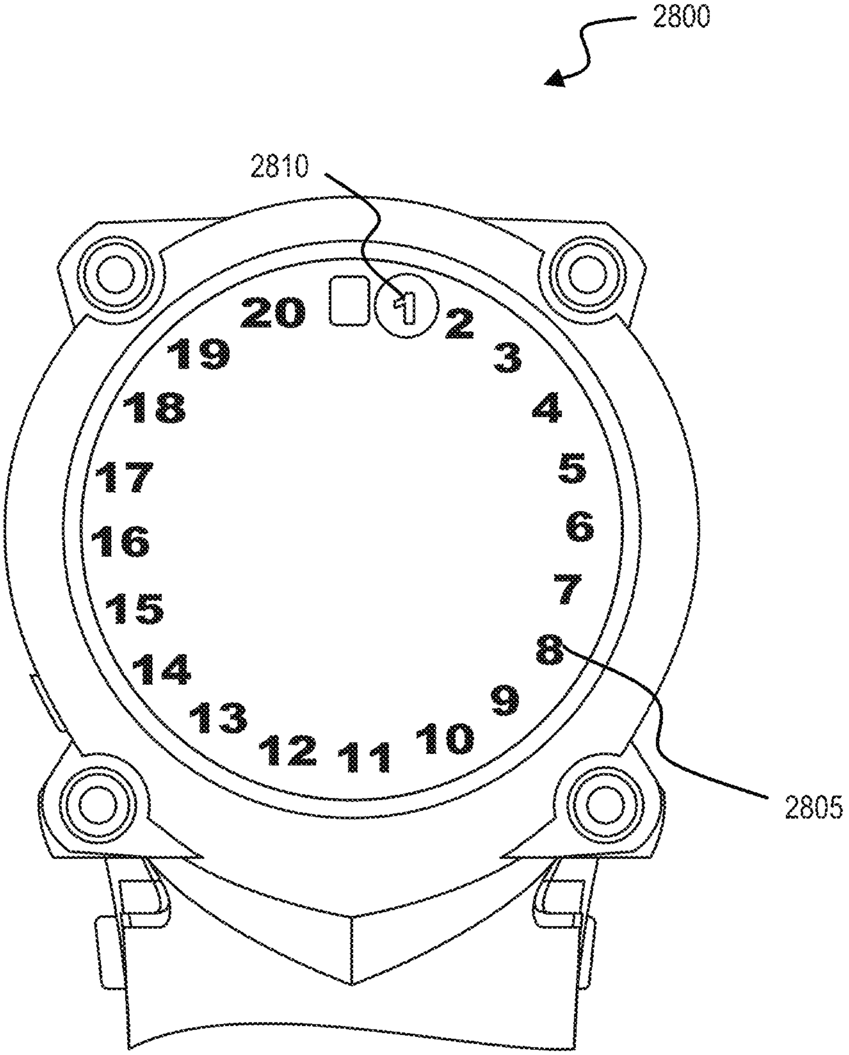
FIG. 28 illustrates a torque setting indication interface, according to embodiments described herein.

FIG. 28 illustrates an embodiment 2800 of the power tool 10 that includes a torque setting indicator 2805 on a side portion (e.g., the rear housing portion 31 of FIG. 1) of the power tool 2800. The torque setting indicator is formed as a ring (e.g., an LED ring). The torque setting indicator can illuminate different segments of the torque setting indicator to indicate a torque setting for the power tool 2800. A torque setting 2810 for the power tool 2800 is provided by the illuminated segment of the torque setting indicator 2705. In the illustrated embodiment, the torque setting is a low value (e.g., 1 of 21). In the illustrated embodiment, a numerical representation is provided to indicate a relative value of the torque setting.

Figure 29:
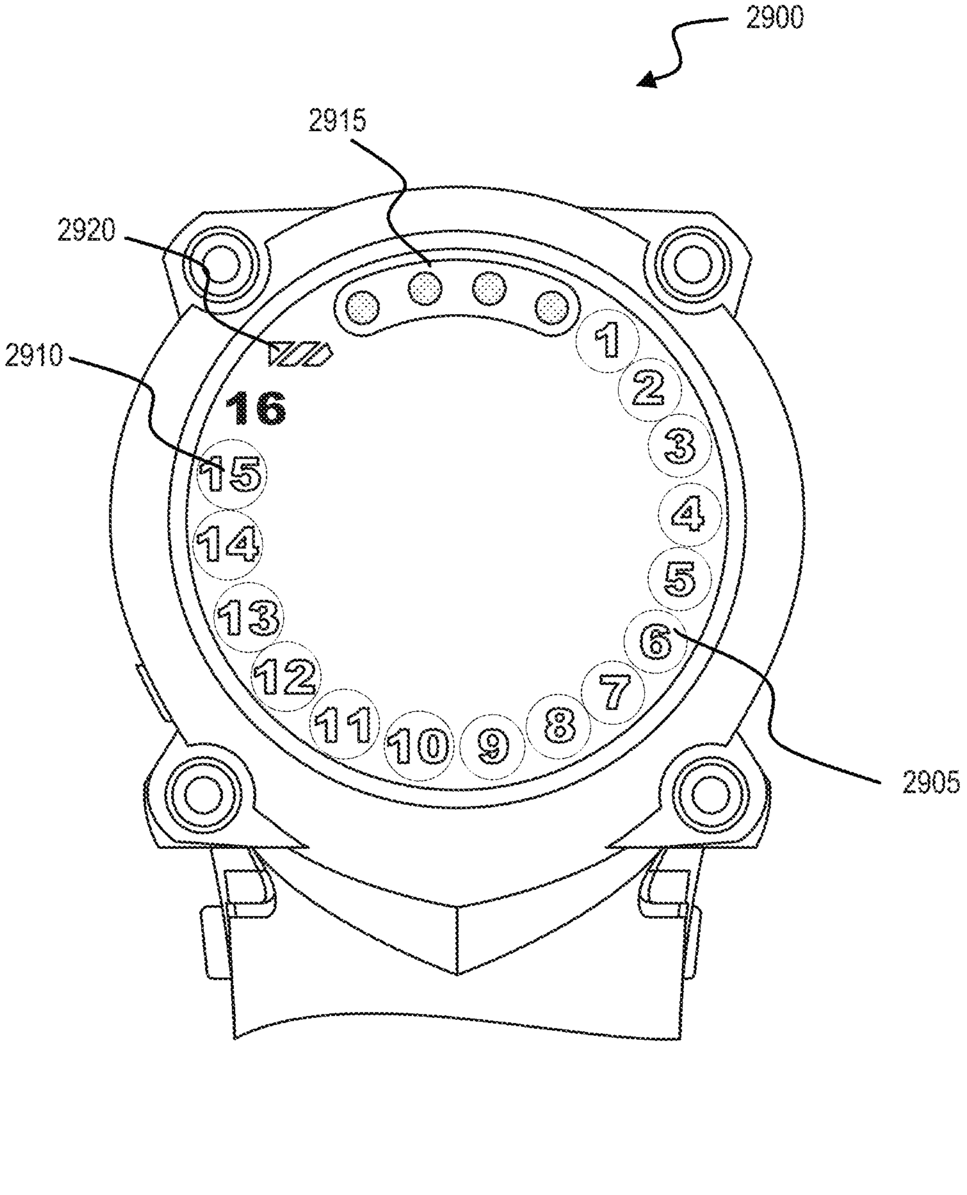
FIG. 29 illustrates a torque setting indication interface, according to embodiments described herein.

FIG. 29 illustrates an embodiment 2900 of the power tool 10 that includes a torque setting indicator 2905 on a side portion (e.g., the rear housing portion 31 of FIG. 1) of the power tool 2900. The torque setting indicator is formed as a ring (e.g., an LED ring). The torque setting indicator can illuminate different segments of the torque setting indicator to indicate a torque setting for the power tool 2900. A torque setting 2910 for the power tool 2900 is provided by the illuminated segment of the torque setting indicator 2905. In the illustrated embodiment, the torque setting is a higher value (e.g., 15 of 16). In the illustrated embodiment, a numerical representation is provided to indicate a relative value of the torque setting. The power tool 2900 can also include a battery pack state-of-charge indicator 2915 that is combined with the torque setting indicator 2905. In some embodiments, the power tool 2900 also includes a mode setting 2920 that indicates an operational mode of the power tool 2900.

Figure 30:
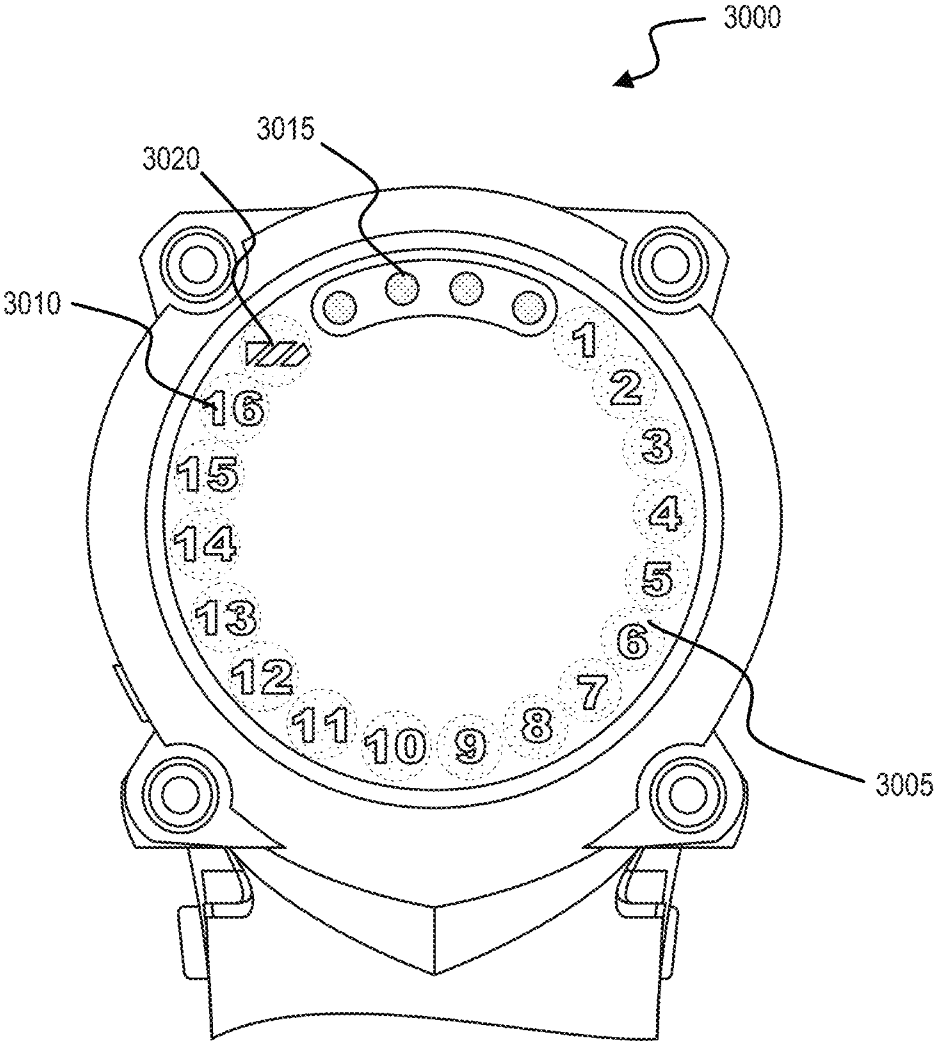
FIG. 30 illustrates a torque setting indication interface, according to embodiments described herein.

FIG. 30 illustrates an embodiment 3000 of the power tool 10 that includes a torque setting indicator 3005 on a side portion (e.g., the rear housing portion 31 of FIG. 1) of the power tool 3000. The torque setting indicator is formed as a ring (e.g., an LED ring). The torque setting indicator can illuminate different segments of the torque setting indicator to indicate a torque setting for the power tool 3000. A torque setting 3010 for the power tool 3000 is provided by the illuminated segment of the torque setting indicator 3005. In the illustrated embodiment, the torque setting is a high value (e.g., 16 of 16). In the illustrated embodiment, a numerical representation is provided to indicate a relative value of the torque setting. The power tool 3000 can also include a battery pack state-of-charge indicator 3015 that is combined with the torque setting indicator 3005. In some embodiments, the power tool 3000 also includes a mode setting 3020 that indicates an operational mode of the power tool 2900 (e.g., a screw mode). The power tool 3000 is configured to, for example, illuminate the torque setting indicator 3005 (e.g., in green or a color other than the normal color [e.g., white]) to provide a clutch out indication (e.g., an electronic clutch is engaged, a torque setting for a clutch has been met and/or exceeded, etc.). In some embodiments, the torque setting indicator 3005 can flash or blink to indicate that the electronic clutch is engaged. In some embodiments, when the electronic clutch is engaged, the power tool 10 disables or pulses (e.g., to cause vibrations that a user can feel and to mimic a mechanical clutch) the motor to provide a physical indication that the electronic clutch is engaged. In some embodiments, the power tools described herein are configured to control the motor to generate an audible indication (e.g., by applying a high-frequency signal to the motor such that a sound is generated but the motor does not rotate), as described in greater detail below.

Figure 31:
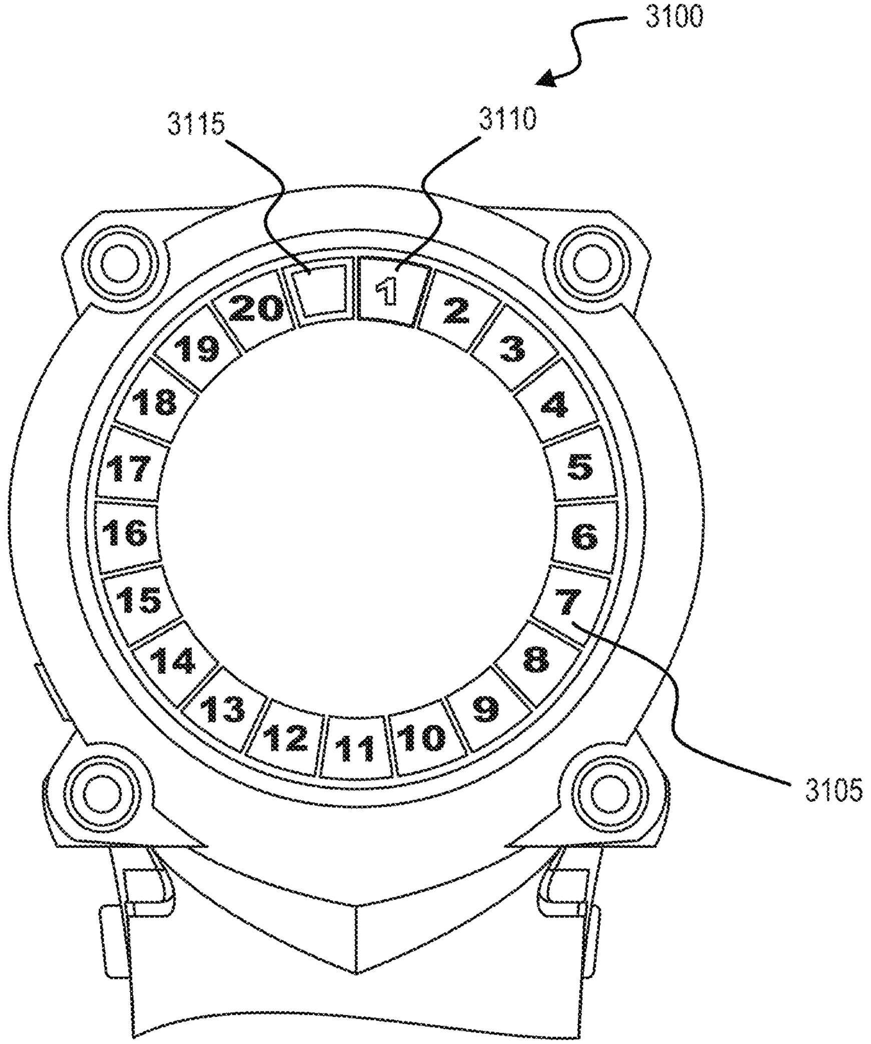
FIG. 31 illustrates a torque setting indication interface, according to embodiments described herein.

FIG. 31 illustrates an embodiment 3100 of the power tool 10 that includes a torque setting indicator 3105 on a side portion (e.g., the rear housing portion 31 of FIG. 1) of the power tool 3100. The torque setting indicator is formed as a ring (e.g., an LED ring). The torque setting indicator can illuminate different segments of the torque setting indicator to indicate a torque setting for the power tool 3100. A torque setting 3110 for the power tool 3100 is provided by the illuminated segment of the torque setting indicator 3105. In the illustrated embodiment, the torque setting is a low value (e.g., 1 of 20). In the illustrated embodiment, a numerical representation is provided to indicate a relative value of the torque setting. In some embodiments, the power tool 3100 also includes a mode setting 3115 that indicates an operational mode of the power tool 3100.

Figure 32:
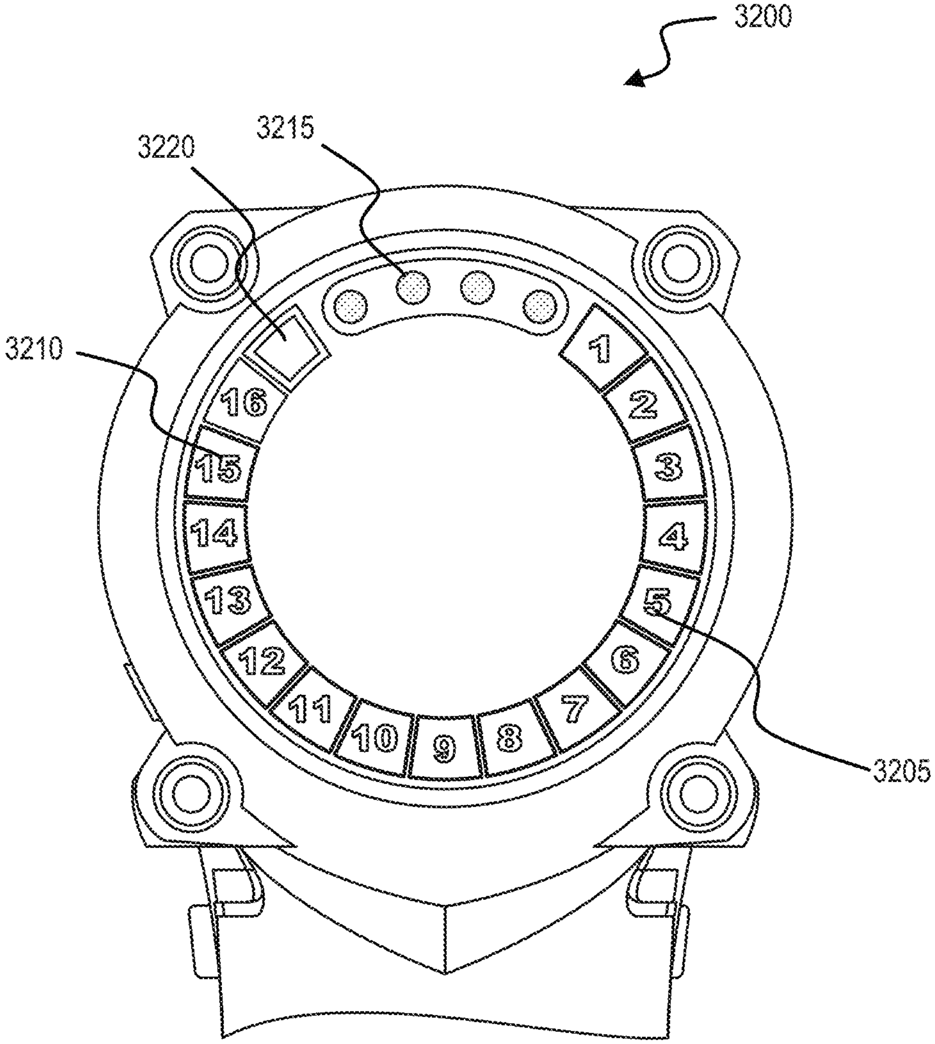
FIG. 32 illustrates a torque setting indication interface, according to embodiments described herein.

FIG. 32 illustrates an embodiment 3200 of the power tool 10 that includes a torque setting indicator 3205 on a side portion (e.g., the rear housing portion 31 of FIG. 1) of the power tool 3200. The torque setting indicator is formed as a ring (e.g., an LED ring). The torque setting indicator can illuminate different segments of the torque setting indicator to indicate a torque setting for the power tool 3200. A torque setting 3210 for the power tool 3200 is provided by the illuminated segment of the torque setting indicator 3205. In the illustrated embodiment, the torque setting is a higher value (e.g., 15 of 16). In the illustrated embodiment, a numerical representation is provided to indicate a relative value of the torque setting. The power tool 3200 can also include a battery pack state-of-charge indicator 3215 that is combined with the torque setting indicator 3205. In some embodiments, the power tool 3200 also includes a mode setting 3220 that indicates an operational mode of the power tool 3200.

Figure 33:
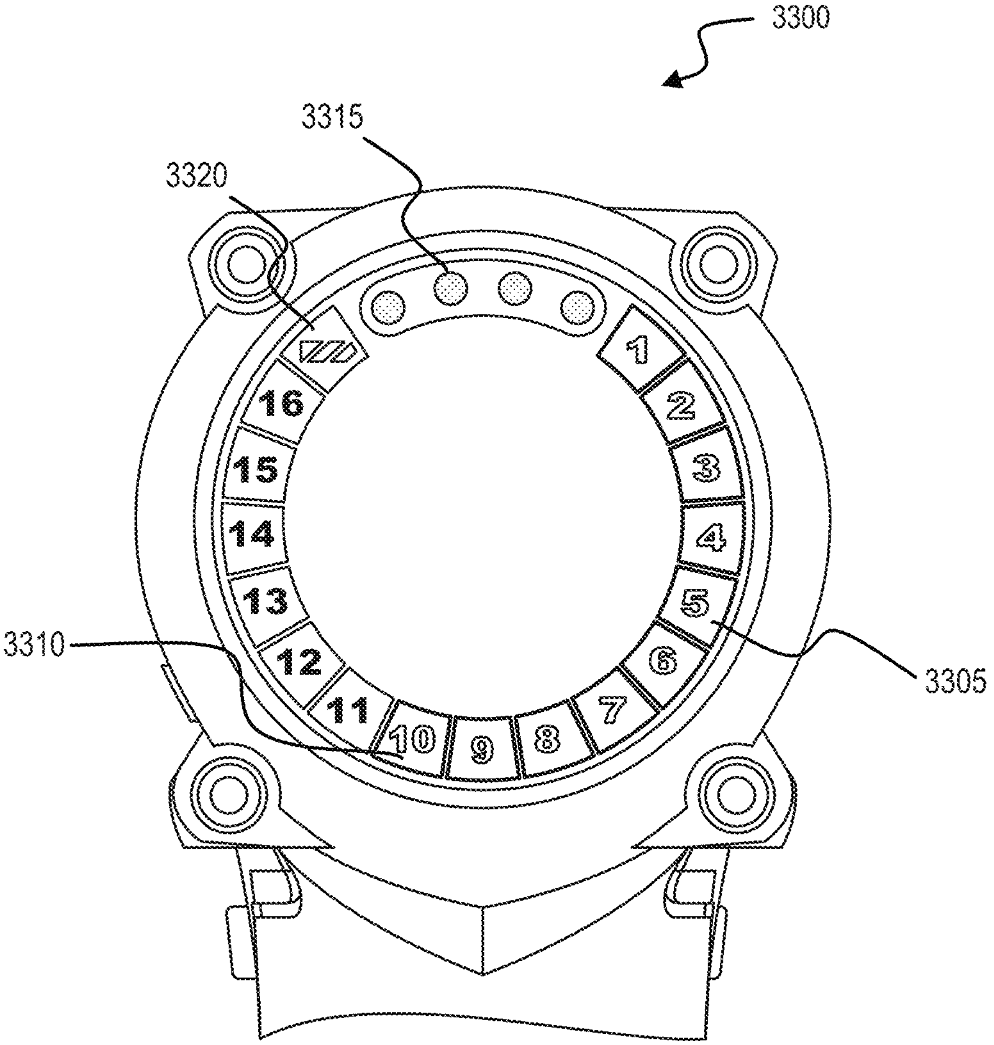
FIG. 33 illustrates a torque setting indication interface, according to embodiments described herein.

FIG. 33 illustrates an embodiment 3300 of the power tool 10 that includes a torque setting indicator 3305 on a side portion (e.g., the rear housing portion 31 of FIG. 1) of the power tool 3300. The torque setting indicator is formed as a ring (e.g., an LED ring). The torque setting indicator can illuminate different segments of the torque setting indicator to indicate a torque setting for the power tool 3300. A torque setting 3310 for the power tool 3300 is provided by the illuminated segment of the torque setting indicator 3205. In the illustrated embodiment, the torque setting is a medium value (e.g., 10 of 16). In the illustrated embodiment, a numerical representation is provided to indicate a relative value of the torque setting. The power tool 3300 can also include a battery pack state-of-charge indicator 3315 that is combined with the torque setting indicator 3305. In some embodiments, the power tool 3300 also includes a mode setting 3320 that indicates a particular operational mode of the power tool 3300.

Figure 34:
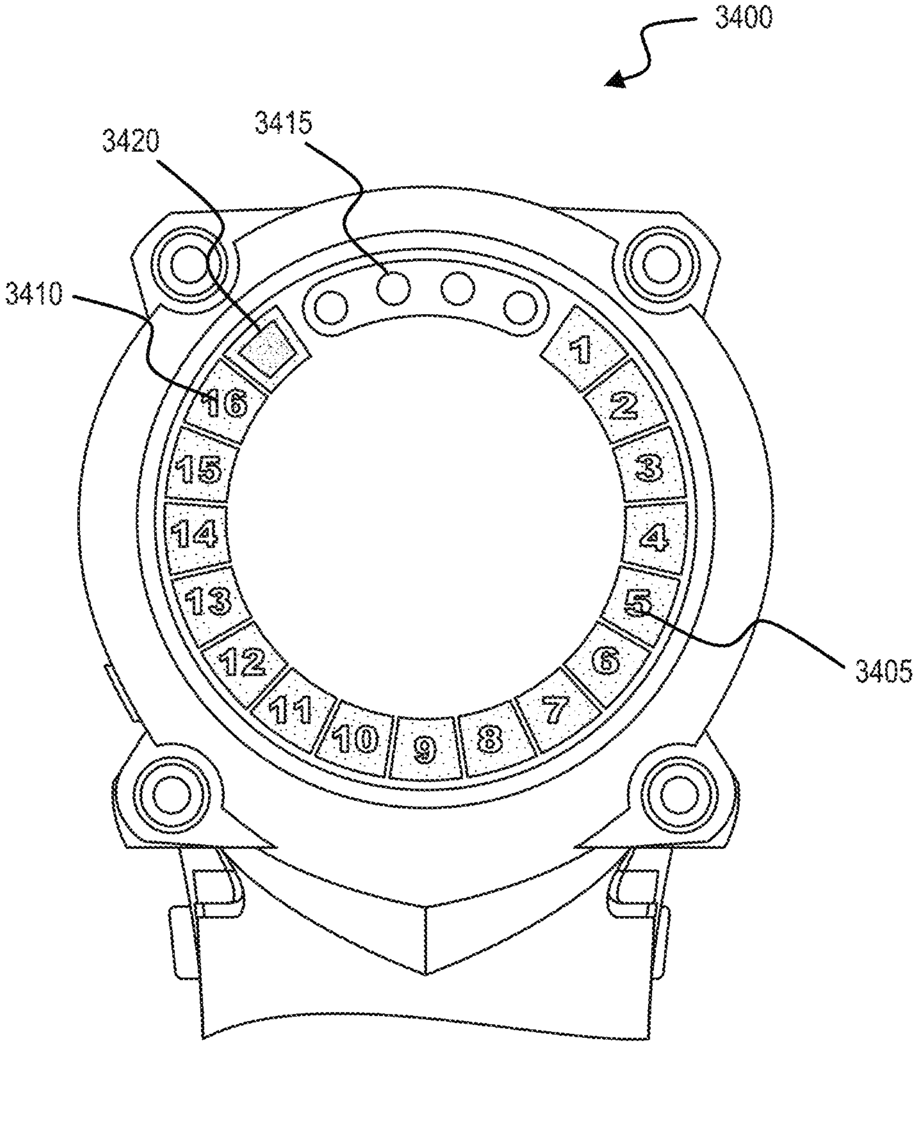
FIG. 34 illustrates a torque setting indication interface, according to embodiments described herein.

FIG. 34 illustrates an embodiment 3400 of the power tool 10 that includes a torque setting indicator 3405 on a side portion (e.g., the rear housing portion 31 of FIG. 1) of the power tool 3400. The torque setting indicator is formed as a ring (e.g., an LED ring). The torque setting indicator can illuminate different segments of the torque setting indicator to indicate a torque setting for the power tool 3400. A torque setting 3410 for the power tool 3400 is provided by the illuminated segment of the torque setting indicator 3405. In the illustrated embodiment, the torque setting is a high value (e.g., 16 of 16). In the illustrated embodiment, a numerical representation is provided to indicate a relative value of the torque setting. The power tool 3400 can also include a battery pack state-of-charge indicator 3415 that is combined with the torque setting indicator 3405. In some embodiments, the power tool 3400 also includes a mode setting 3420 that indicates an operational mode of the power tool 3400. The power tool 3400 is configured to, for example, illuminate the torque setting indicator 3405 (e.g., in green or a color other than the normal color [e.g., white]) to provide a clutch out indication (e.g., an electronic clutch is engaged, a torque setting for a clutch has been met and/or exceeded, etc.). In some embodiments, the torque setting indicator 3005 can flash or blink to indicate that the electronic clutch is engaged. In some embodiments, when the electronic clutch is engaged, the power tool 10 disables or pulses (e.g., to cause vibrations that a user can feel and to mimic a mechanical clutch) the motor to provide a physical indication that the electronic clutch is engaged. In some embodiments, the power tools described herein are configured to control the motor to generate an audible indication (e.g., by applying a high-frequency signal to the motor such that a sound is generated but the motor does not rotate), as described in greater detail below.

Figure 35:
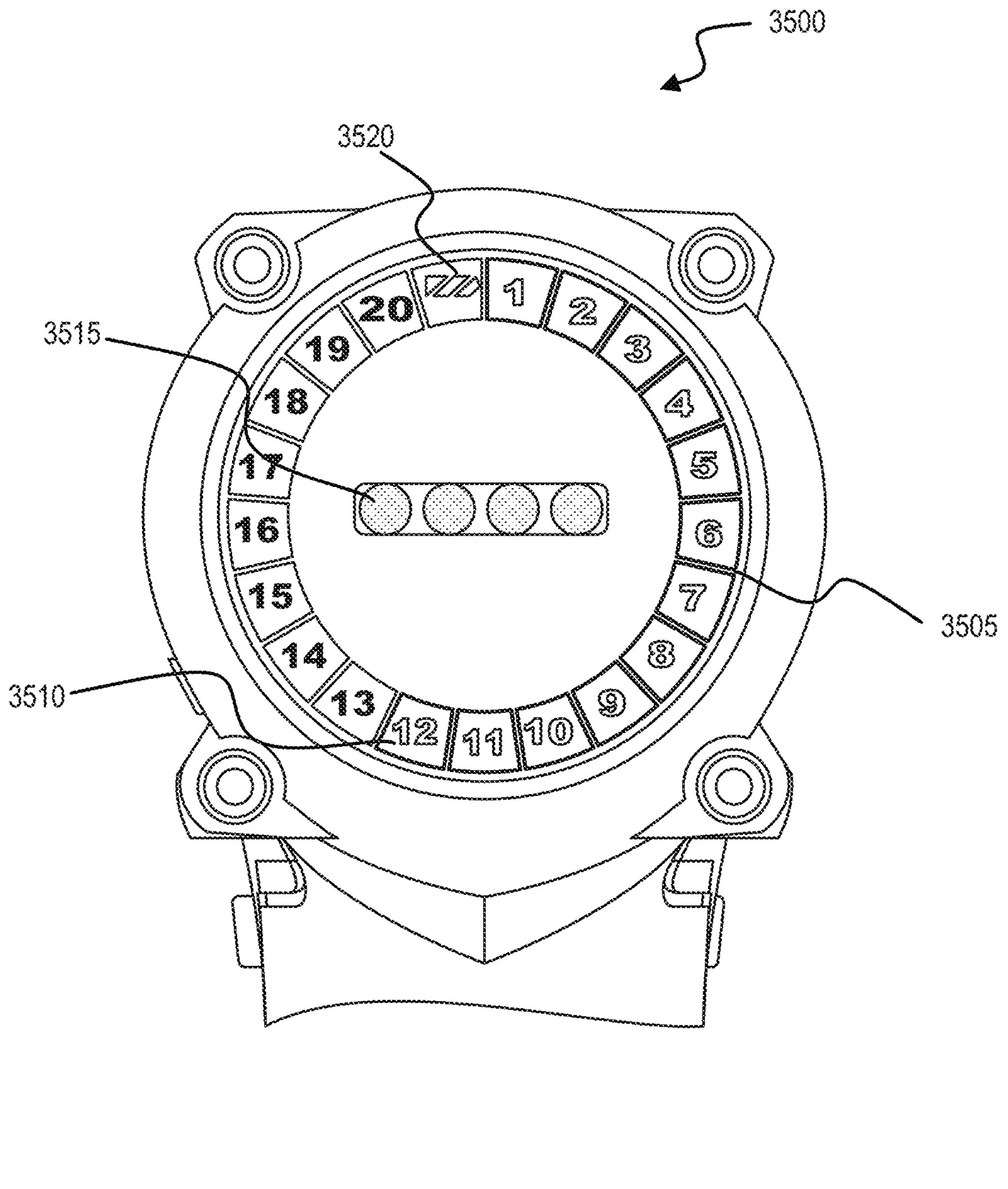
FIG. 35 illustrates a torque setting indication interface, according to embodiments described herein.

FIG. 35 illustrates an embodiment 3500 of the power tool 10 that includes a torque setting indicator 3505 on a side portion (e.g., the rear housing portion 31 of FIG. 1) of the power tool 3500. The torque setting indicator is formed as a ring (e.g., an LED ring). The torque setting indicator can illuminate different segments of the torque setting indicator to indicate a torque setting for the power tool 3500. A torque setting 3510 for the power tool 3500 is provided by the illuminated segment of the torque setting indicator 3505. In the illustrated embodiment, the torque setting is a medium value (e.g., 12 of 20). In the illustrated embodiment, a numerical representation is provided to indicate a relative value of the torque setting. The power tool 3500 can also include a battery pack state-of-charge indicator 3515 that is centrally located within the torque setting indicator 3505 such that it is separate from the torque setting indicator 3505. In some embodiments, the power tool 3500 also includes a mode setting 3520 that indicates an operational mode of the power tool 3500.

Figure 36:
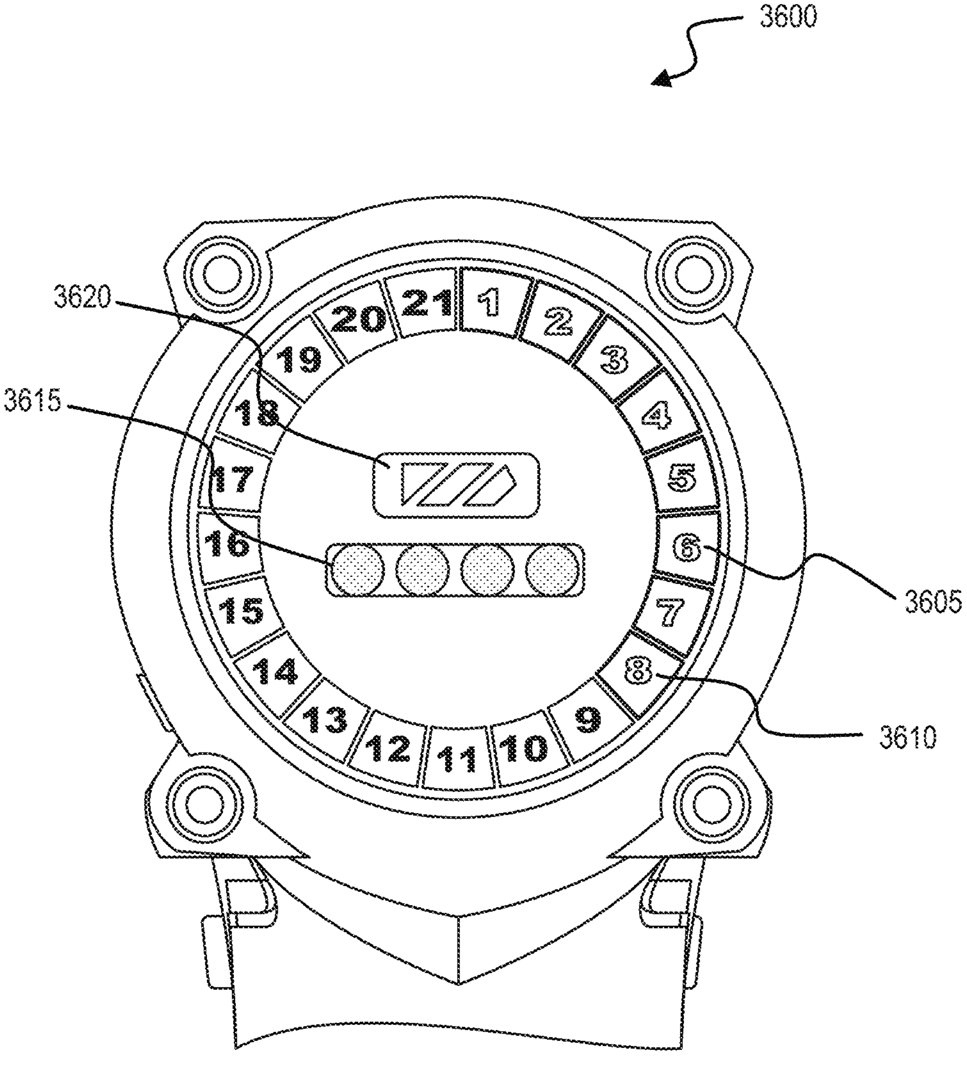
FIG. 36 illustrates a torque setting indication interface, according to embodiments described herein.

FIG. 36 illustrates an embodiment 3600 of the power tool 10 that includes a torque setting indicator 3605 on a side portion (e.g., the rear housing portion 31 of FIG. 1) of the power tool 3600. The torque setting indicator is formed as a ring (e.g., an LED ring). The torque setting indicator can illuminate different segments of the torque setting indicator to indicate a torque setting for the power tool 3600. A torque setting 3610 for the power tool 3600 is provided by the illuminated segment of the torque setting indicator 3605. In the illustrated embodiment, the torque setting is a lower value (e.g., 8 of 21). In the illustrated embodiment, a numerical representation is provided to indicate a relative value of the torque setting. The power tool 3600 can also include a battery pack state-of-charge indicator 3615 that is centrally located within the torque setting indicator 3605 such that it is separate from the torque setting indicator 3605. In some embodiments, the power tool 3600 also includes a mode setting 3620 that indicates an operational mode of the power tool 3600. The mode setting 3620 can be centrally located within the torque setting indicator 3605 such that it is separate from the torque setting indicator 3605 (e.g., adjacent to the battery pack state-of-charge indicator 3615).

As indicated above with respect to the exemplary power tools described herein, the power tools can be configured to control the motor to make an audible sound. The audible sound can be used to provide an indication to a user of a condition of the power tool (e.g., a fault condition, an error state, e-clutch active or activated, torque limit reached, etc.). Such operations for power tools are described below with respect to a communication system 3700. However, the same functionality is equally applicable to any of the power tools previously described.

Figure 37:
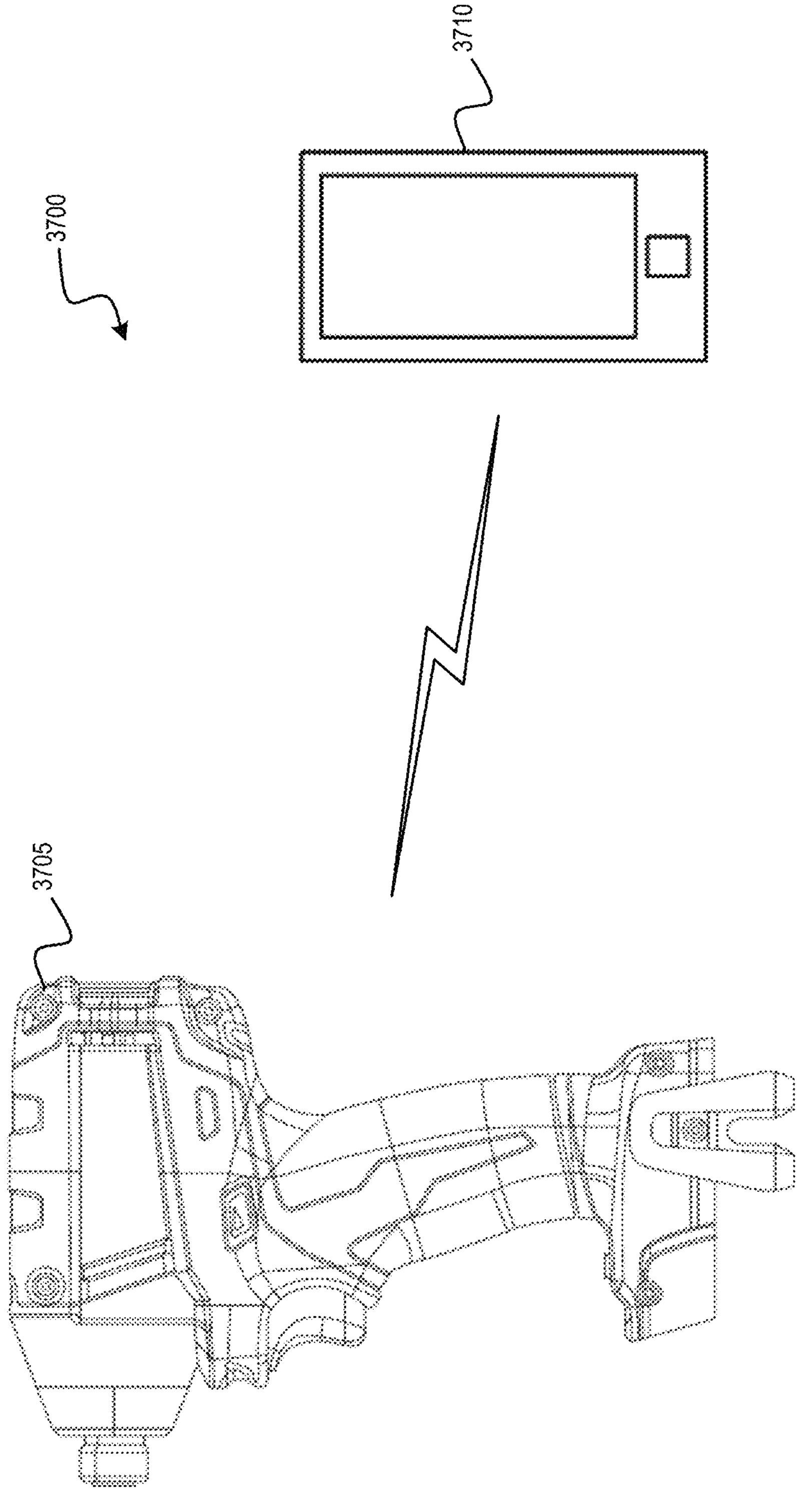
FIG. 37 illustrates a communication system, according to embodiments described herein.

FIG. 37 illustrates a communication system 3700 that includes a power tool 3705 (e.g., power tool 10) and an external device 3710. The power tool 3705 is configured to communicate wirelessly with the external device 3710 while the power tool 3705 is within communication range of the external device 3710. In some embodiments, the power tool 3705 wirelessly transmits signals that indicate one or more of a power tool status, power tool operation statistics, power tool identification, stored power tool usage information, power tool maintenance data, and/or other data associated with the power tool 3705 to the external device 3710. In some embodiments, the external device 3710 is configured to wirelessly transmit signals that are used to control operation of power tool 3705. For example, the external device 3710 may be configured to transmit signals that command power tool 3705 to perform an operation (e.g., emit a sound, illuminate an indicator, etc.), configure one or more parameters of the power tool 3705, update firmware of the power tool 3705, and/or remotely control some other feature of the power tool 3705. Although illustrated as including a single power tool 3705 and a single external device 3710, it should be understood that in some embodiments, the communication system 3700 includes a plurality of power tools and/or a plurality of external devices.

Figure 38:
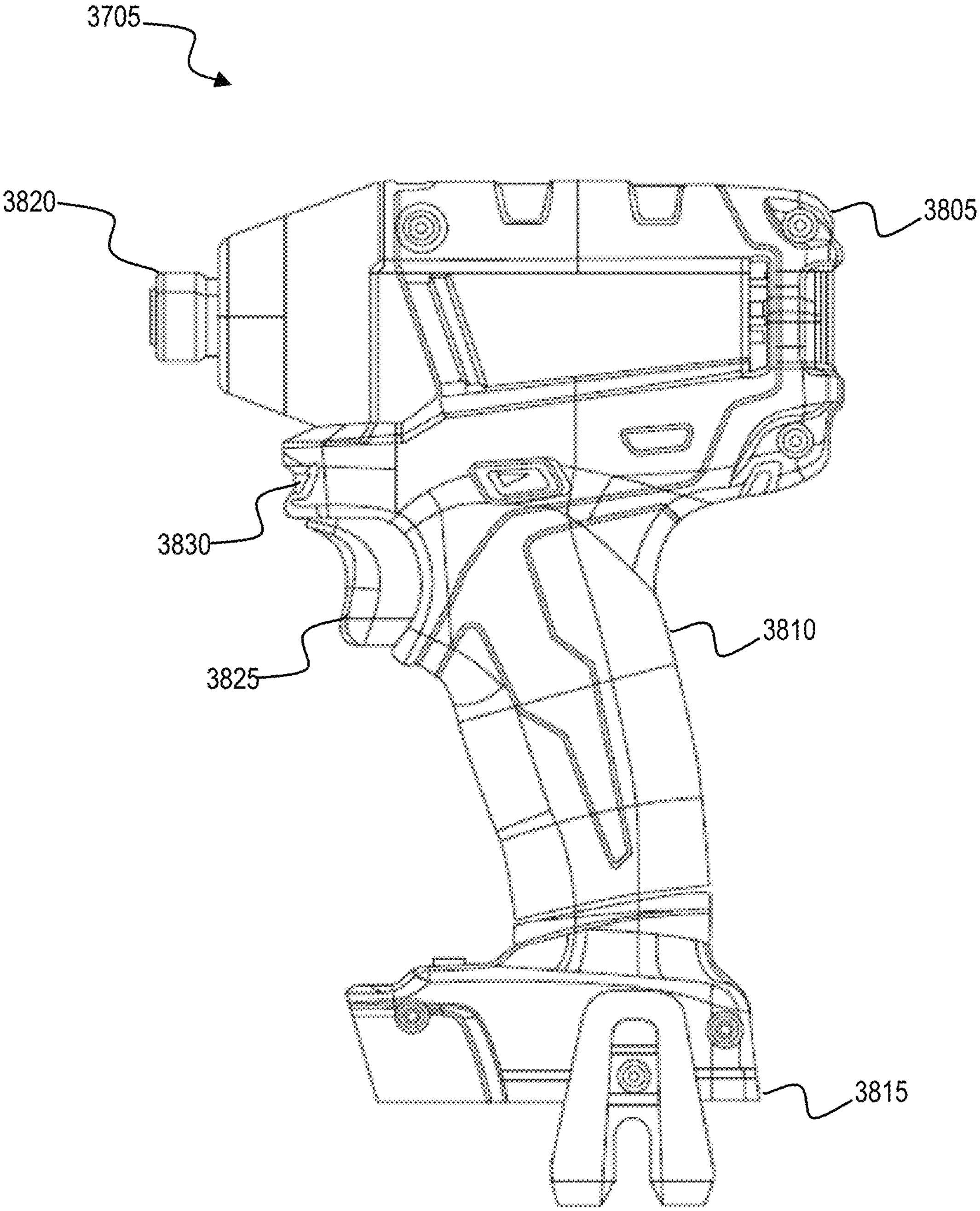
FIG. 38 illustrates a power tool included in the communication system of FIG. 37, according to embodiments described herein.

FIG. 38 illustrates a side view of the power tool 3705. Although illustrated as a battery pack powered impact driver, it should be understood that the power tool 3705 may be implemented as any type of power tool that includes a motor (e.g., a power drill, a hammer drill, a pipe cutter, a sander, a nailer, a grease gun, etc.). That is, the illustrated impact driver is merely representative and power tool 3705 is not limited in implementation to an impact driver. Moreover, any description of power tool 3705 with respect to the figures is similarly applicable to other types of power tools used to implement power tool 3705.

As shown in FIG. 38, the power tool 3705 includes an upper main body 3805, a handle 3810, a battery pack receiving portion 3815, an output drive device, or mechanism, 3820, a trigger 3825, and one or more indicators 3830 (e.g., a worklight). The drive device 3820 is illustrated as a socket. However, it should be understood that other types of power tools may include other types of drive devices. For example, the drive device for a power drill may include a bit driver, while the drive device for a pipe cutter may include a blade. The battery pack receiving portion 3815 is configured to receive and couple to a removeable and rechargeable battery pack 3835 (see FIG. 39) that provides power to the power tool 3705. The battery pack receiving portion 3815 includes a connecting structure to engage a mechanism that secures the battery pack 3835 and an interface to electrically connect the battery pack 3835 to the power tool 3705. In some embodiments, power tool 3705 is powered by an AC power source and does not include a battery pack receiving portion.

Figure 39:
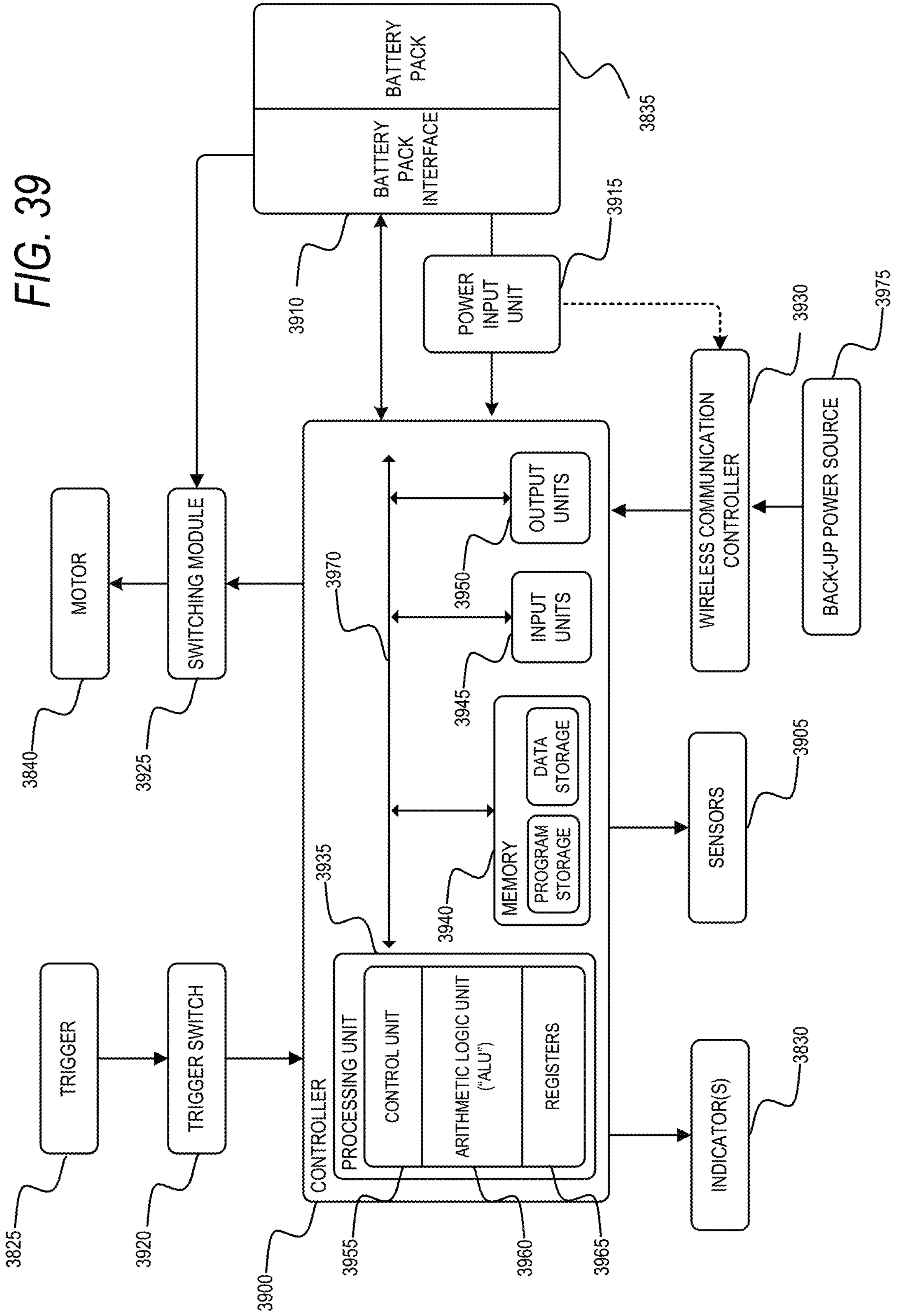
FIG. 39 illustrates a block diagram of a controller included in the power tool of FIG. 38, according to embodiments described herein.
Figure 40:
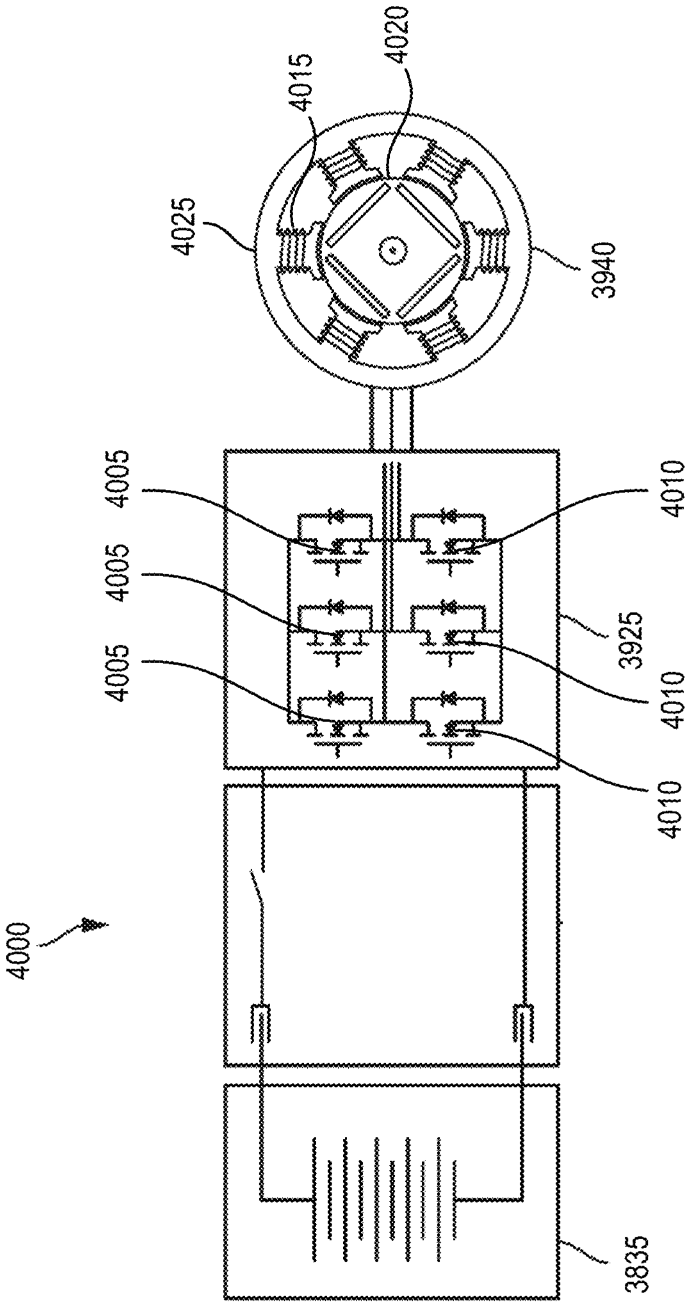
FIG. 40 illustrates a circuit diagram for a switching module, according to embodiments described herein.

As shown in FIGS. 39 and 40, the power tool 3705 further includes a motor 3840. The motor 3840 actuates the drive device 3820 and allows the drive device 3820 to perform a particular operating task (e.g., tightening). In operation, the motor 3840 is energized based on the position of the trigger 3825. For example, when the trigger 3825 is depressed the motor 3840 is energized. Likewise, when the trigger 3825 is released, the motor 3840 is de-energized. As will be described in more detail below, the motor 3840 may also be energized in response to a command received from the external device 3710 (e.g., without the trigger 3825 being actuated).

FIG. 39 is a generalized schematic of the controller 3900 included in the power tool 3705. The controller 3900 is electrically and/or communicatively connected to a variety of modules or components of the power tool 3705. For example, the controller 3900 may be connected to the one or more indicators 3830, one or more sensors 3905, a battery pack interface 3910, a power input unit 3915, a trigger switch 3920, a switching module 3925, and a wireless communication controller 3930.

The controller 3900 includes a plurality of electrical and electronic components that provide power, operational control, and protection to the components and modules within the controller 3900 and/or power tool 3705. For example, the controller 3900 includes, among other things, a processing unit, or processor, 3935 (e.g., a microprocessor, an electronic processor, an electronic controller, a microcontroller, or another suitable programmable device), a memory 3940, input units 3945, and output units 3950. The processing unit 3935 includes, among other things, a control unit 3955, an arithmetic logic unit ("ALU") 3960, and a plurality of registers 3965 (shown as a group of registers in FIG. 39), and is implemented using a known computer architecture (e.g., a modified Harvard architecture, a von Neumann architecture, etc.). The processing unit 3935, the memory 3940, the input units 3945, and the output units 3950, as well as the various modules connected to the controller 3900 are connected by one or more control and/or data buses (e.g., common bus 3970). The control and/or data buses are shown generally in FIG. 39 for illustrative purposes. The use of one or more control and/or data buses for the interconnection between and communication among the various modules and components would be known to a person skilled in the art in view of the embodiments described herein.

The memory 3940 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 3935 is connected to the memory 3940 and executes software instructions that are capable of being stored in a RAM of the memory 3940 (e.g., during execution), a ROM of the memory 3940 (e.g., on a generally permanent basis), or another non-transitory computer readable medium such as another memory or a disc. Software included in the implementation of the power tool 3705 can be stored in the memory 3940 of the controller 3900. The software includes, for example, firmware, one or more applications, program data, filters, rules, one or more program modules, and other executable instructions. The controller 3900 is configured to retrieve from the memory 3940 and execute, among other things, instructions related to the control processes and methods described herein. In other embodiments, the controller 3900 includes additional, fewer, or different components.

The controller 3900 is configured to activate the one or more indicators 3830 to illuminate a workpiece and/or otherwise convey information about power tool 3705 to a user. The indicators 3830 include, for example, one or more light emitting diodes (LEDs), a display screen, etc. In addition to or in place of visual indicators, the indicators 3830 may also include a speaker or a tactile feedback mechanism to convey information to a user through audible or tactile outputs. The sensors 3905 are coupled to the controller 3900 and communicate to the controller 3900 various signals indicative of one or more conditions of the power tool 3705 and/or the motor 3840. The sensors 3905 may include one or more Hall effect sensors, current sensors, voltage sensors, temperature sensors, torque sensors, and/or other types of sensors.

The battery pack interface 3910 is positioned within the battery pack receiving portion 3815 and includes a combination of mechanical and electrical components configured to and operable for interfacing (e.g., mechanically, electrically, and communicatively connecting) the power tool 3705 with the battery pack 3835. The battery pack interface 3910 transmits the power received from the battery pack 3835 to the power input unit 3915. The power input unit 3915 includes active and/or passive components (e.g., voltage step-down controllers, voltage converters, rectifiers, filters, etc.) to regulate or control the power received through the battery pack interface 3910 and to the wireless communication controller 3930 and controller 3900. When the battery pack 3835 is not coupled to the power tool 3705, the wireless communication controller 3930 may be configured to receive power from a back-up power source 3975 (e.g., a coin cell battery).

Furthermore, the controller 3900 is configured to control operation of the motor 3840. FIG. 40 illustrates a circuit diagram of a motor driving circuit 4000 included in power tool 3705. As shown, the motor driving circuit 4000 includes the battery pack 3835, the motor 3840, and the switching module 3925. The switching module 3925 includes a number of high side power switching devices (e.g., FETs) 4005 and a number of low side power switching devices (e.g., FETs) 4010.

During normal operation of power tool 3705 (e.g., during a fastening operation), the controller 3900 provides control signals to control the high side FETs 4005 and the low side FETs 4010 to drive the motor 3840 based on motor feedback information and user controls. For example, when a user of the power tool 3705 pulls or activates the trigger 3825, the controller 3900 detects activation of the trigger switch 3920 and applies control signals to the switching module 3925. The control signals applied by the controller 3900 selectively enable and disable the FETs 4005 and 4010 (e.g., sequentially, in pairs). The selective control of the FETs 4005 and 4010 results in power from the battery pack 3835 being selectively applied to stator coils 4015 of the motor 3840, thereby causing rotation of a rotor 4020 relative to a stator 4025. In some embodiments, the control signals include pulse width modulated (PWM) signals having a duty cycle that is set in proportion to or based on the amount of trigger pull of the trigger 3825, to thereby control the speed or torque of the motor 3840.

The controller 3900 is further configured to control the motor 3840 to emit a sound without causing a rotation of the motor 3840. In particular, the controller 3900 is configured to control the switching module 3925 to apply high frequency current signals within the audible frequency range (e.g., 20 Hz-20 kHz) to the stator coils 4015. That is, the controller 3900 controls the switching module 3925 to apply current signals having a high frequency, such as a frequency greater than 10 kHz, within the audible frequency range. When the stator coils 4015 of motor 3840 are excited by the high frequency current signals, the rotor 4020 does not rotate relative to the stator 4025. Rather, under high frequency excitation, the motor 3840 emits a sound signal in the audible frequency range (e.g., 20 Hz-20 kHz).

To cause rotation of the rotor 4020 relative to the stator 4025, the frequency of the current applied to the stator coils 4015 needs to be synchronized with the rotor 4020. When the frequency of the current, or the excitation frequency, applied to the stator coils 4015 is too high at startup of the motor 3840, synchronization between the applied current and the rotor 4020 does not occur. Accordingly, the rotor 4020 does not rotate relative the stator 4025 when the excitation frequency is too high. Rather, when the motor 3840 is under a high frequency excitation, the motor 3840 experiences a time varying force that causes the structure of the motor 3840 to vibrate and generate a sound. That is, the motor 3840 vibrates and emits a sound at the excitation frequency without any movement of the rotor 4020 when the excitation frequency is too high. Therefore, the controller 3900 is operable to control the motor 3840 to emit a sound without rotating the rotor 4020 by applying a high frequency current signal within the audible frequency range to the stator coils 4015 at startup of the motor 3840.

Accordingly, the controller 3900 is configured to operate the motor 3840 as a speaker by applying high frequency current signals to the stator coils 4015. In some embodiments, the sound signal emitted by the motor 3840 is a random signal within the audible frequency range for human beings. In some embodiments, the controller 3900 controls the switching of the FETs 4005 and 4010 such that motor 3840 emits a particular sound signal (e.g., a song [e.g., linked to an audio streaming service] or other tune, multiple tone sequences, etc.). In some embodiments, the controller 3900 controls the switching of the FETs 4005 and 4010 such that motor 3840 emits sound in a particular pattern. For example, the controller 3900 may be configured to control the motor 3840 to periodically emit a sound. In some embodiments, the controller 3900 controls the motor 3840 to emit a sound based on an input form the user of power tool 3705 (e.g., a mode setting). For example, the controller 3900 may be configured to control the motor 3840 to emit a sound when a user pulls or activates the trigger 3825 for a predetermined amount of time. In some embodiments, the controller 3900 is configured to control the motor 3840 to emit a sound in response to wireless communication controller 3930 receiving a signal from the external device 3710. For example, when a user of the external device 3710 wants to locate the power tool 3705, the user may transmit, by the external device 3710, a signal that instructs the motor 3840 to emit a sound. In some embodiments, the controller 3900 is configured to control the motor 3840 to emit a sound in response to a torque value (e.g., a precision torque value) is reached.

Figure 41:
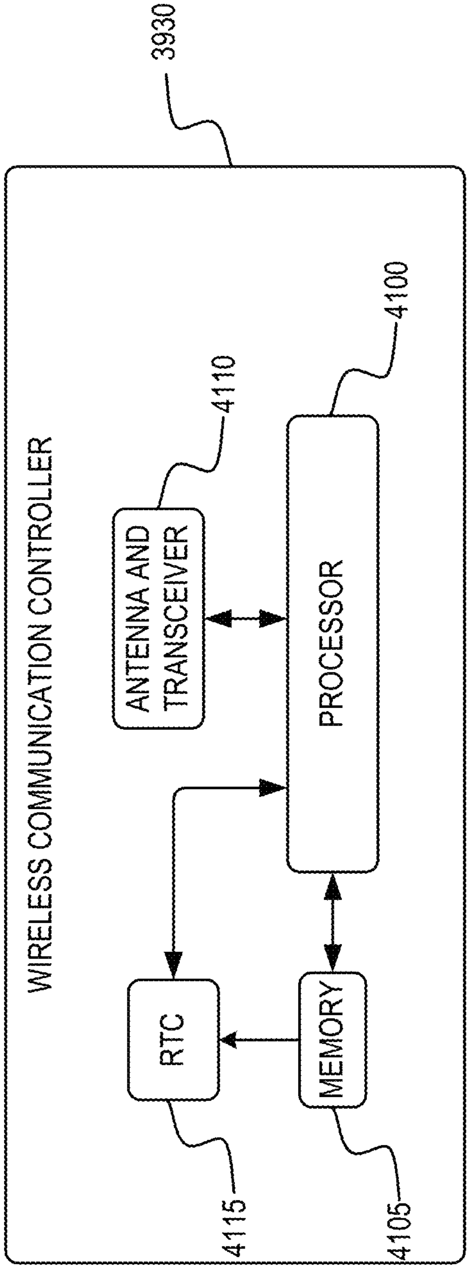
FIG. 41 illustrates a block diagram of a wireless communication controller included in the power tool of FIG. 38, according to embodiments described herein.

FIG. 41 is a generalized schematic of the wireless communication controller 3930 connected to the controller 3900 of power tool 3705. As shown, the wireless communication controller 3930 includes a processor 4100, a memory 4105, a radio antenna and transceiver 4110, and a real-time clock (RTC) 4115. The wireless communication controller 3930 enables the power tool 3705 to communicate with the external device 3710. The radio antenna and transceiver 4110 operate together to send and receive wireless messages to and from the external device 3710 and the processor 4100. The memory 4105 can store instructions to be implemented by the processor 4100 and/or may store data related to communications between the power tool 3705 and the external device 3710, or the like. The processor 4100 for the wireless communication controller 3930 controls wireless communications between the power tool 3705 and the external device 3710. For example, the processor 4100 associated with the wireless communication controller 3930 buffers incoming and/or outgoing data, communicates with the controller 3900, and determines the communication protocol and/or settings to use in wireless communications.

In the illustrated embodiment, the wireless communication controller 3930 is a Bluetooth® controller. The Bluetooth® controller communicates with the external device 3710 employing the Bluetooth® protocol. Therefore, in the illustrated embodiment, when the external device 3710 and the power tool 3705 are within a communication range (i.e., in proximity) of each other, they are capable of exchanging data. In other embodiments, the wireless communication controller 3930 communicates using other protocols (e.g., Wi-Fi, ZigBee, a proprietary protocol, etc.) over different types of wireless networks. For example, the wireless communication controller 3930 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

The wireless communication controller 3930 is configured to receive data from the controller 3900 and relay the information to the external device 3710 via the antenna and transceiver 4110. In a similar manner, the wireless communication controller 3930 is configured to receive information (e.g., commands, configuration and programming information, etc.) from the external device 3710 via the antenna and transceiver 4110 and relay the information to the controller 3900.

The RTC 4115 can increment and keep time independently of the other power tool 3705 components. The RTC 4115 can receive power from the battery pack 3835 when the battery pack 3835 is connected to the power tool 3705 and can receive power from the back-up power source 3975 when the battery pack 3835 is not connected to the power tool 3705. Having the RTC 4115 as an independently powered clock enables time stamping of operational data (stored in memory 4105 for later export) and a security feature whereby a lockout time is set by a user (e.g., via the external device 3710) and the tool is locked-out when the time of the RTC 4115 exceeds the set lockout time.

The external device 3710 included in communication system 3700 is illustrated as a smartphone. However, it should be understood that the external device 3710 may be implemented as any electronic device that is capable of communicating wirelessly with the power tool 3705 and providing a user interface. For example, in some embodiments, the external device is implemented as a laptop computer, a tablet computer, a personal digital assistant (PDA), or another electronic device capable of communicating wirelessly with the power tool 3705 and providing a user interface.

Figure 42:
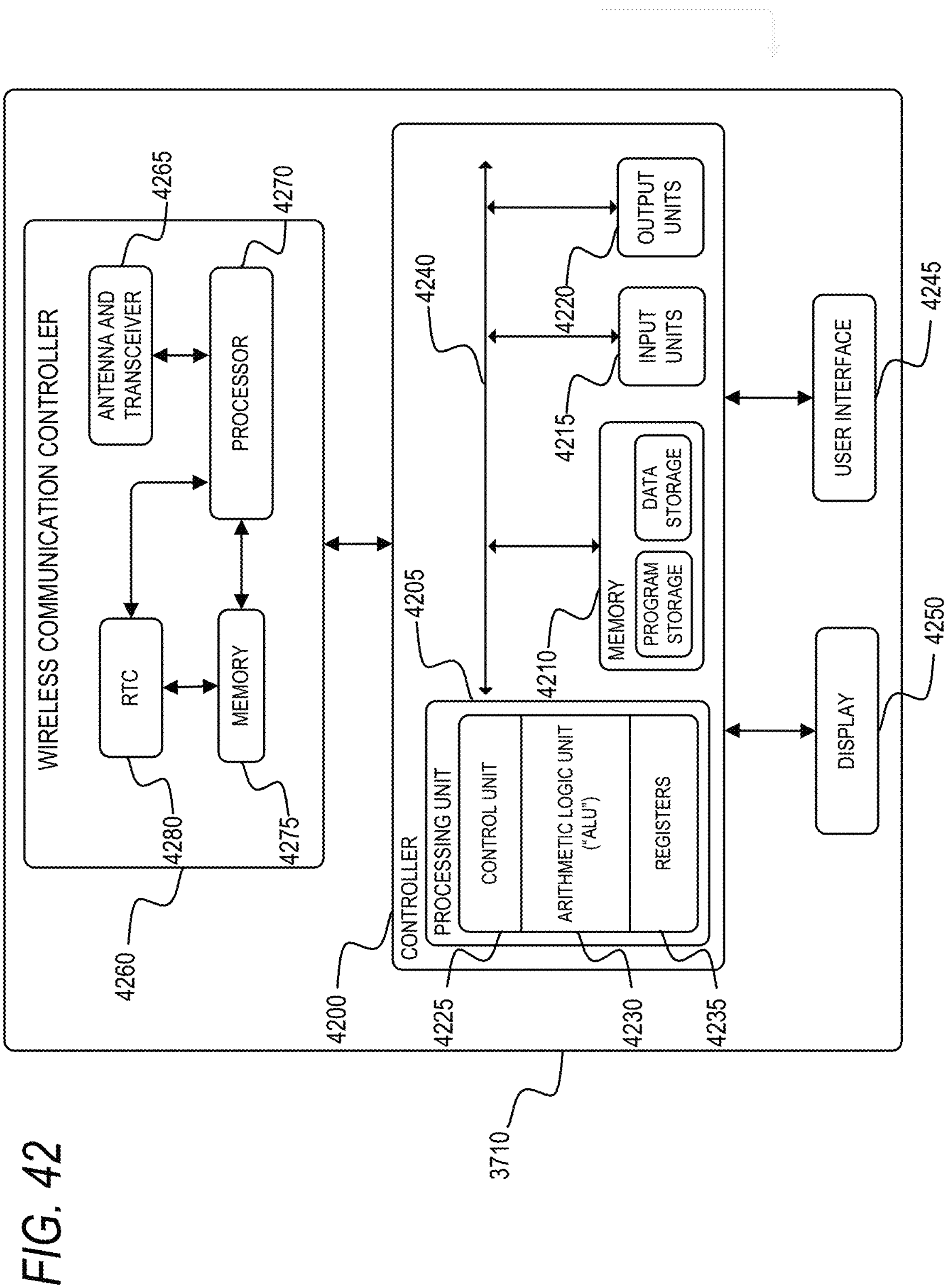
FIG. 42 illustrates a block diagram of an external device included in the communication system of FIG. 37, according to embodiments described herein.

FIG. 42 illustrates a generalized schematic of the external device 3710. The external device 3710 includes a controller 4200 that includes a plurality of electrical and electronic components that provide power, operational control, and protection to the components and modules within the controller 4200 and/or external device 3710. For example, the controller 4200 includes, among other things, a processing unit, or processor, 4205 (e.g., a microprocessor, an electronic processor, an electronic controller, a microcontroller, or another suitable programmable device), a memory 4210, input units 4215, and output units 4220. The processing unit 4205 includes, among other things, a control unit 4225, an arithmetic logic unit ("ALU") 4230, and a plurality of registers 4235 (shown as a group of registers in FIG. 42), and is implemented using a known computer architecture (e.g., a modified Harvard architecture, a von Neumann architecture, etc.). The processing unit 4205, the memory 4210, the input units 4215, and the output units 4220, as well as the various modules connected to the controller 4200 are connected by one or more control and/or data buses (e.g., common bus 4240). The control and/or data buses are shown generally in FIG. 42 for illustrative purposes. The use of one or more control and/or data buses for the interconnection between and communication among the various modules and components would be known to a person skilled in the art in view of the embodiments described herein.

The memory 4210 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 4205 is connected to the memory 4210 and executes software instructions that are capable of being stored in a RAM of the memory 4210 (e.g., during execution), a ROM of the memory 4210 (e.g., on a generally permanent basis), or another non-transitory computer readable medium such as another memory or a disc. Software included in the implementation of the external device 3710 can be stored in the memory 4210 of the controller 4200. The software includes, for example, firmware, one or more applications, program data, filters, rules, one or more program modules, and other executable instructions. The controller 4200 is configured to retrieve from the memory 4210 and execute, among other things, instructions related to the control processes and methods described herein. In other embodiments, the controller 4200 includes additional, fewer, or different components.

The controller 4200 is electrically and/or communicatively connected to additional components of the external device 3710, such as a user interface 4245, a display 4250, and a wireless communication controller 4260. Although not illustrated, the user interface 4245 includes one or more user input devices (e.g., buttons, dials, toggle switches, and a microphone for voice control) and user outputs (e.g., speakers and tactile feedback elements). The display 4250 is configured to output visual data to a user. In some embodiments, the display 4250 is implemented as a touch-screen display that is configured to both output visual data to a user and receiver user inputs.

The wireless communication controller 4260 enables the external device 3710 to communicate wirelessly with the wireless communication controller 4260 of the power tool 3705. Similar to the wireless communication controller 3930 of the power tool 3705, the wireless communication controller 4260 of the external device 3710 includes at least a radio antenna and transceiver 4265 that operate together to send and receive wireless messages to and from the external device 3710. The wireless communication controller 4260 further includes a processor 4270, a memory 4275, and an RTC 4280. The memory 4275 can store instructions to be implemented by the processor 4270 and/or may store data related to communications between the power tool 3705 and the external device 3710, or the like. The processor 4270 for the wireless communication controller 4260 controls wireless communications between the power tool 3705 and the external device 3710. For example, the processor 4270 associated with the wireless communication controller 4260 buffers incoming and/or outgoing data, communicates with the controller 4200, and determines the communication protocol and/or settings to use in wireless communications.

In the illustrated embodiment, the wireless communication controller 4260 is a Bluetooth® controller. The Bluetooth® controller communicates with the power tool 3705 employing the Bluetooth® protocol. Therefore, in the illustrated embodiment, when the external device 3710 and the power tool 3705 are within a communication range (i.e., in proximity) of each other, they are capable of exchanging data. In other embodiments, the wireless communication controller 4260 communicates using other protocols (e.g., Wi-Fi, ZigBee, a proprietary protocol, etc.) over different types of wireless networks. For example, the wireless communication controller 4260 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

The wireless communication controller 4260 is configured to receive data from the controller 4200 and relay the information to the power tool 3705 via the antenna and transceiver 4265. That is, the controller 4200 transmits signals to the power tool 3705 using the wireless communication controller 4260. For example, the controller 4200 is configured to, by the wireless communication controller 4260, transmit a signal to power tool 3705 that causes the motor 3840 to emit a sound. In a similar manner, the wireless communication controller 4260 is configured to receive information (e.g., operating data, advertisement packets, etc.) from the power tool 3705 via the antenna and transceiver 4265 and relay the information to the controller 4200.

Returning to the controller 4200 of the external device 3710, the processor 4205 is configured to execute application software stored in memory 4210 to generate a graphical user interface (GUI) on the display 4250. A user of external device 3710 is able to interact with the power tool 3705 using the user interface 4245 and the GUI generated on display 4250. As described above, in some instances, the display 4250 is a touch screen display, and thus, a user of the external device 3710 is able to interact with the external device 3710 using only the display 4250. As will become apparent from the description below, at least in some embodiments, the app on the external device 3710 provides a user with a single entry point for controlling, accessing, and/or interacting with the power tool 3705. In embodiments in which communication system 3700 includes a plurality of power tools 3705, the app provides the user with the ability to control, access, and/or interact with each of the plurality of power tools 3705.

Figure 43:
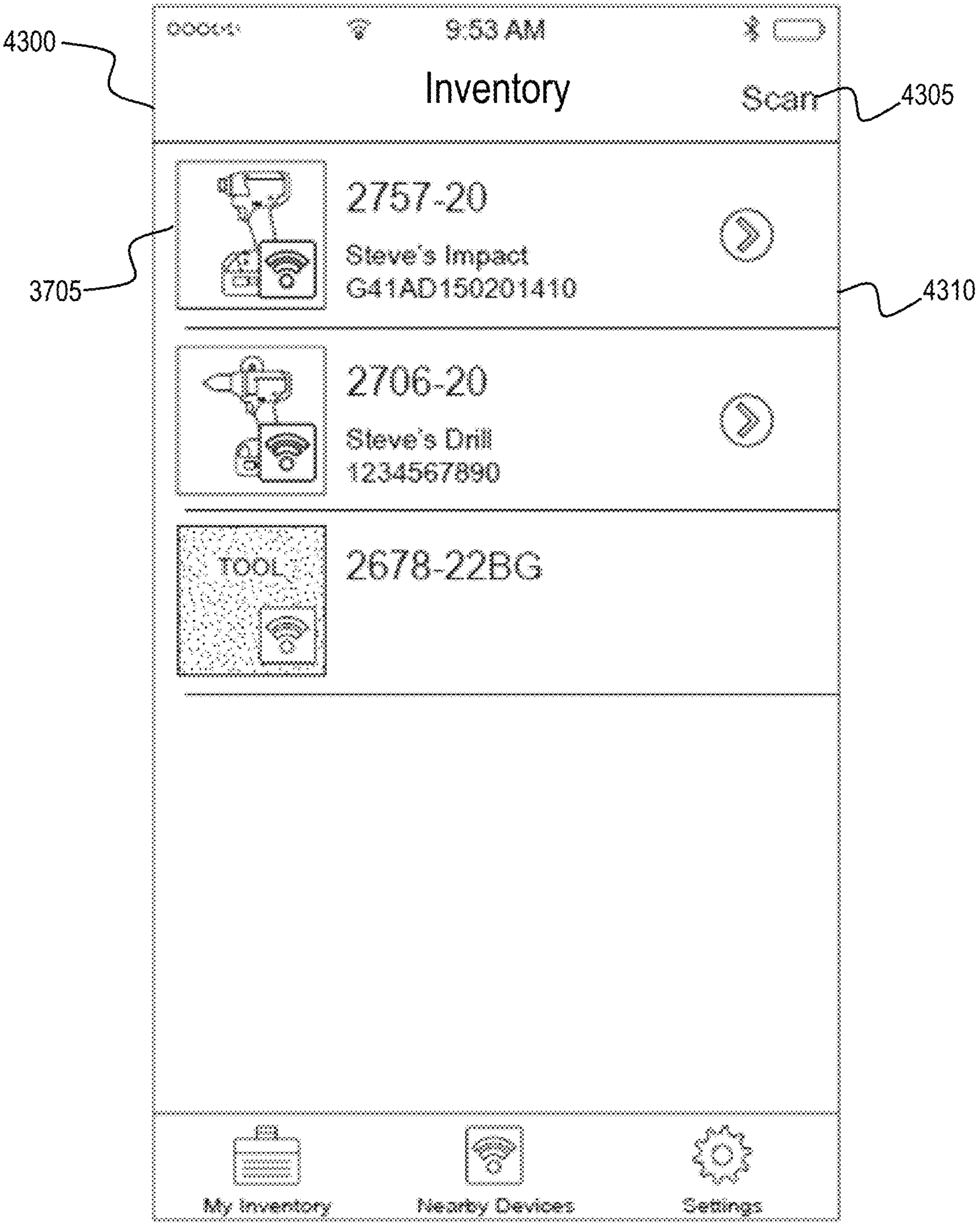
FIGS. 43, 44, and 45 illustrate exemplary interfaces of the external device for controlling the power tool, according to embodiments described herein.

FIG. 43 illustrates an example of a tool inventory screen 4300 of the GUI generated on the display 4250. The tool inventory screen 4300 is used to identify and communicatively connect with power tools 3705 that are within communication range of the external device 3710. For instance, in response to a user selecting the "scan" input 4305, the wireless communication controller 4260 scans a radio wave communication spectrum used by the power tools 3705 and identifies any power tools 3705 within range that are advertising. The identified power tools 3705 that are advertising are then listed on the tool inventory screen 4300. As shown in FIG. 43, in response to a scan, three power tools 3705, including the impact driver, that are advertising are listed in the tool inventory list 4310.

From the tool inventory screen 4300, a user can select a power tool from the tool inventory list 4310 to which to communicatively connect. Each type of power tool 3705 with which the external device 3710 can communicate includes an associated tool graphical user interface (tool interface). When the external device 3710 is communicatively connected to the selected power tool, the controller 4200 displays a tool interface of the selected power tool 3705 on the display 4250.

Figure 44:
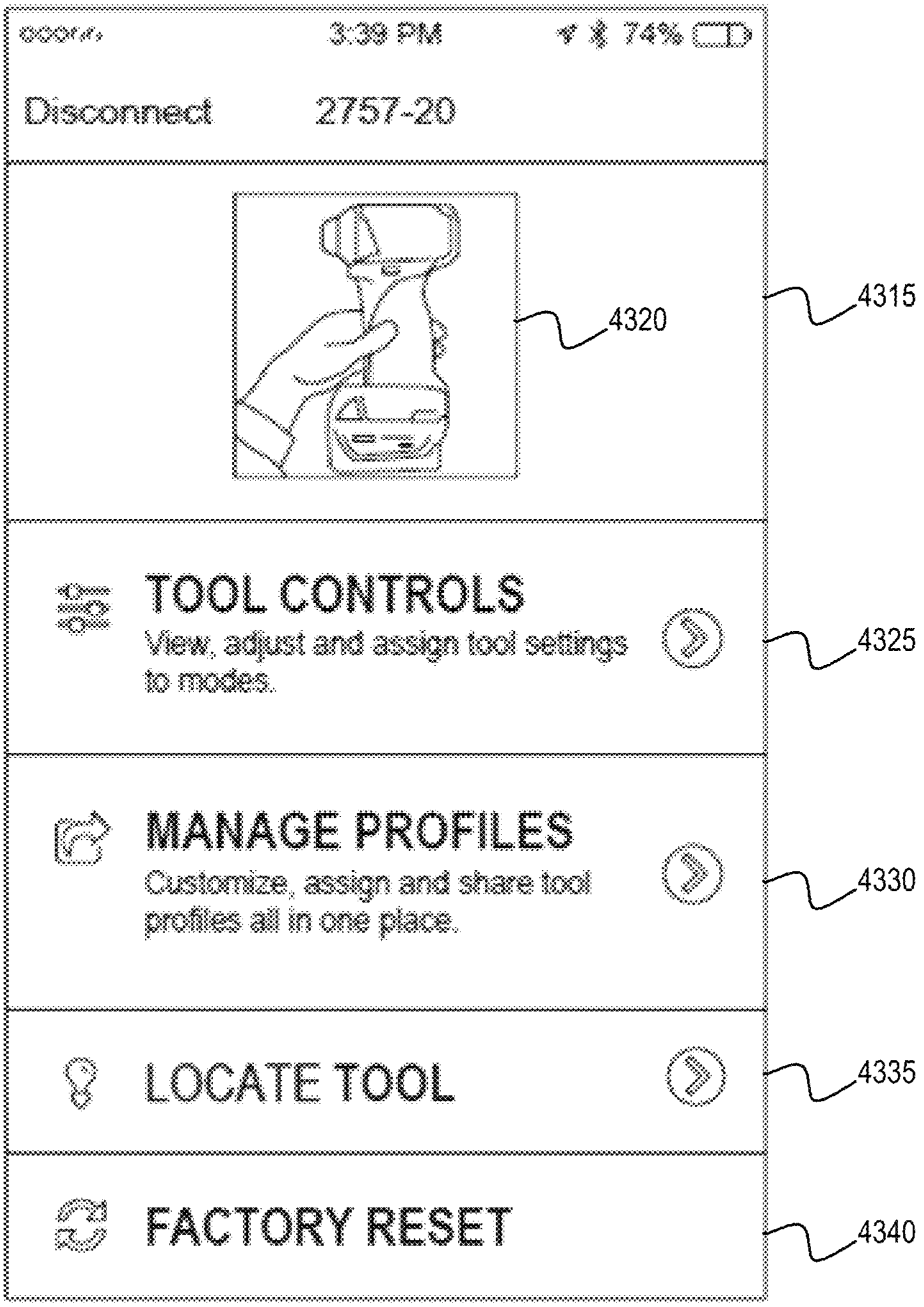

FIG. 44 illustrates an example tool interface screen 4315 when the power tool 3705 connected to external device 3710 is an impact driver. The tool interface screen 4315 includes an icon 4320 for the communicatively connected power tool 3705, which may be the same as the icon shown in the tool inventory list 4310. The tool interface screen 4315 includes a variety of selectable options for interacting with the connected power tool 3705, such as tool controls option 4325, manage profiles option 4330, locate tool option 4335, and factory reset option 4340. The locate tool option 4335 may be selected by a user that is trying to locate the power tool 3705 that is communicatively connected to external device 3710. For example, when the user of the external device 3710 is on a jobsite that includes multiple power tools, the user may desire to cause the power tool 3705 to provide a user-perceptible indication (e.g., emit a sound, flash a light, etc.) to assist the user with locating the power tool 3705.

Figure 45:
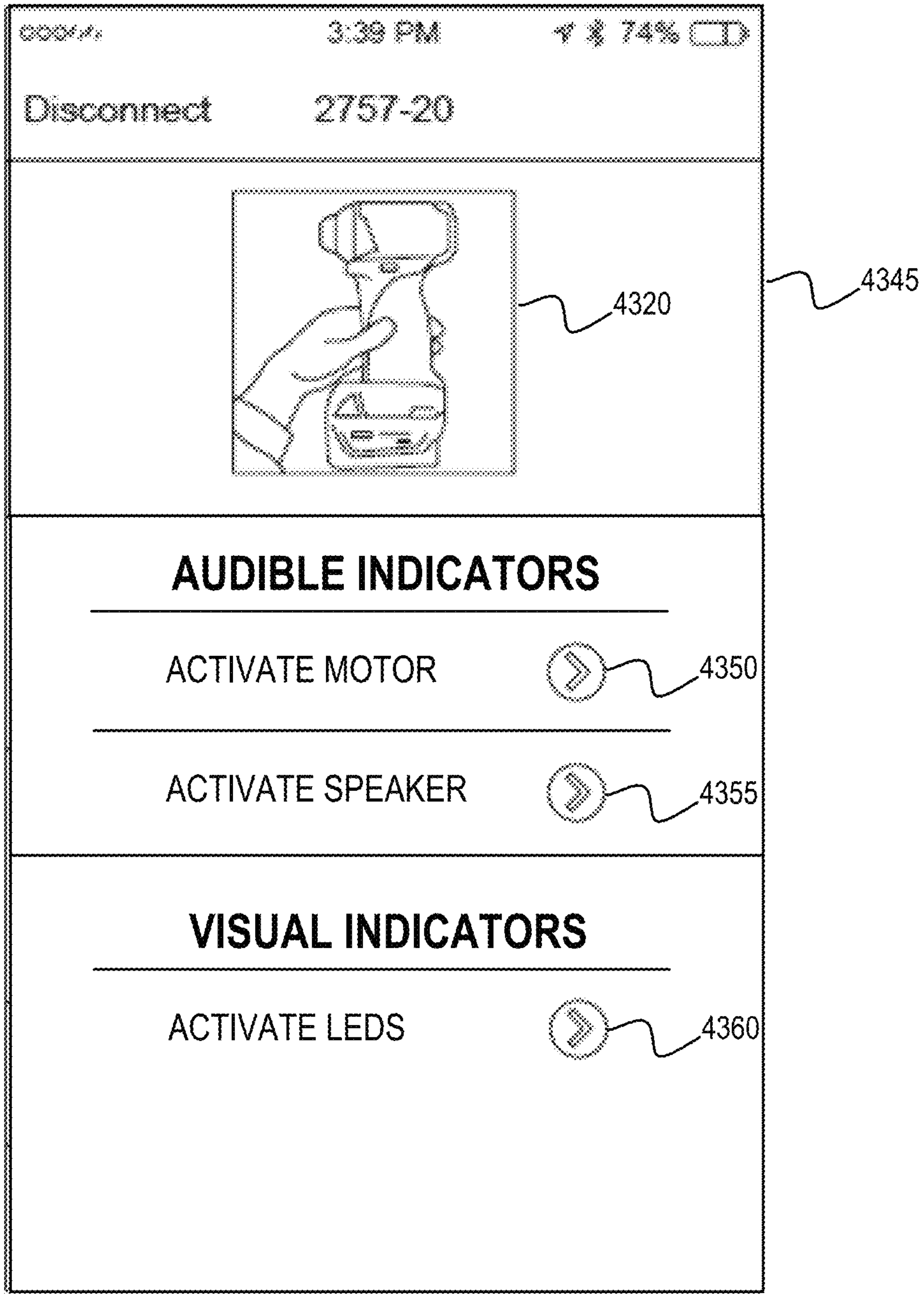

When the locate tool option 4335 is selected, a locate tool screen 4345 is displayed on display 4250, as shown in FIG. 45. The locate tool screen 4345 provides a user with multiple selectable options for commanding the connected power tool 3705 to perform a user-perceptible indication to assist with locating the power tool 3705. For example, the locate tool screen 4345 provides a user with options such as an activate motor option 4350, an activate speaker option 4355, and an activate LED option 4360. Selecting the activate motor option 4350 causes the controller 4200 of external device to transmit, by the wireless communication controller 4260, a signal to power tool 3705 that causes the motor 3840 to emit a sound. In response to receiving, by the wireless communication controller 3930, the activate motor command from external device 3710, the controller 3900 of power tool 3705 is configured to control the switching module 3925 to apply high frequency current signals to the stator coils 4015 of motor 3840. As described above, under high frequency excitation, the motor 3840 does not rotate. However, the motor 3840 emits a sound signal in the audible frequency range. Accordingly, a user of the external device 3710 is able to remotely control the motor 3840 of power tool 3705 to emit a sound signal when the user is attempting to locate the power tool 3705.

In some embodiments, the controller 3900 is configured to control the motor 3840 to emit a sound for a configured amount of time (e.g., 5 seconds, 1 minute, etc.). In some embodiments, the controller 3900 is configured to control the motor 3840 to emit a sound until a user of the external device 3710 transmits a second command that causes the controller 3900 to stop controlling the motor 3840 to emit a sound. For example, upon finding the power tool 3705 when the motor 3840 emits a sound, a user of the external device 3710 may select an option that causes external device 3710 to transmit a signal that commands the controller 3900 to turn off the motor 3840. In some embodiments, the controller 3900 is configured to control the motor 3840 to emit a sound until a user of the power tool 3705 pulls or activates the trigger 3825. In some embodiments, the controller 3900 is configured to control the motor 3840 to emit a sound until a configurable amount of time passes or expires.

Similarly, selecting the activate speaker option 4355 causes the external device 3710 to transmit, by the wireless communication controller 4260, a signal to power tool 3705 that causes a speaker included in the power tool 3705 to emit a sound. In response to receiving, by the wireless communication controller 3930, the activate speaker command from external device 3710, the controller 3900 of power tool 3705 controls a speaker included in power tool 3705 to emit a sound. Likewise, selecting the activate LED option 4360 causes the external device 3710 to transmit, by the wireless communication controller 4260, a signal to power tool 3705 that causes one or more of the LED indicators (e.g., indicators 3830, a worklight, etc.) included in the power tool 3705 to be illuminated. In response to receiving, by the wireless communication controller 3930, the activate LED command from external device 3710, the controller 3900 of power tool 3705 controls the LED indicator(s) 3830 included in power tool 3705 to turn on. In some embodiments, the controller 3900 flashes the LED indicator(s) 3830. In other embodiments, the controller 3900 illuminates the LED indicator(s) 3830 without flashing them. In some embodiments, the controller 3900 is configured to activate the speaker and/or illuminate the LED indicator(s) 3830 for a configurable amount of time. In some embodiments, the controller 3900 is configured to activate the speaker and/or illuminate the LED indicator(s) 230 until a signal that causes the controller 3900 to turn off the speaker and/or LED indicators(s) 3830 is received from the external device 3710. In some embodiments, the controller 3900 is configured to activate the speaker and/or illuminate the LED indicator(s) 230 until a user operates the trigger 3825 of the power tool 3705. In some embodiments, the LED indicator(s) 3830 can generate different colors of light to indicate different conditions or parameters of the power tool 3705 (e.g., green to indicate a torque set point has been reached, red light to indicate a failed joint). In some embodiments, only a subset of the LED indicator(s) 3830 are illuminated to indicate different conditions or parameters of the power tool 3705.

In some embodiments, a user of the external device 3710 is able to command the power tool 3705 to provide one or more audible and visual indications simultaneously. For example, the user of external device 3710 is able to select the activate motor option 4350 and one or more of the activate speaker option 4355 and the activate LED option 4360. When a user of external device 3710 selects both the activate motor option 4350 and the activate LED option 4360, the wireless communication controller 4260 transmits one or more signals to power tool 3705 that cause the motor 3840 to emit a sound and the LED indicator(s) to be illuminated simultaneously. Accordingly, in response to receiving, by the wireless communication controller 3930, the signal from the external device 3710, the controller 3900 is configured to control the motor 3840 to emit a sound and illuminate one or more of the LED indicator(s) 3830 simultaneously.

Figure 46:
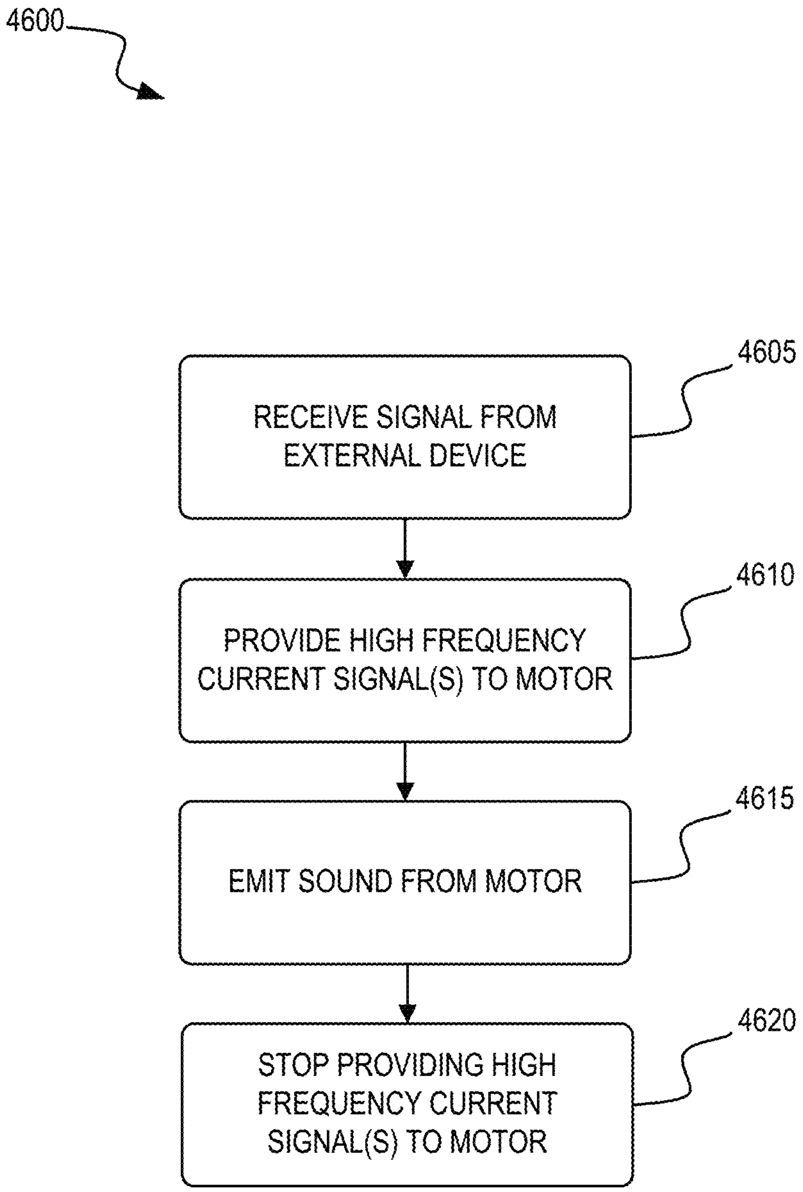
FIG. 46 illustrates a process for locating a power tool, according to embodiments described herein.

FIG. 46 illustrates a process 4600 executed by the controller 3900 for locating the power tool 3705. Process 4600 begins when the controller 3900 receives, by the wireless communication controller 3930, a signal from the external device 3710 that commands the motor 3840 to emit a sound (STEP 4605).

In response to receiving the signal from the external device 3710, controller 3900 is configured to supply one or more high frequency current signals to the stator coils 4015 of motor 3840 (STEP 4610). As described above, the controller 3900 is configured to control the switching module 3925 to selectively supply high frequency current from the battery pack 3835 to the motor 3840. When stator coils 4015 are excited with high frequency current signals, the motor 3840 emits a sound signal (STEP 4615). In particular, the motor 3840 emits a sound signal without rotating the rotor 4020 relative to the stator 4025. After the motor 3840 emits the sound, the controller 3900 is configured to control the switching module 3925 to stop providing high frequency current signals to the stator coils 4015 (STEP 4620).

Although the disclosure has been described in detail with reference to certain preferred embodiments, variations and modifications exist within the scope and spirit of one or more independent aspects of the disclosure as described.

Various features of the disclosure are set forth in the following clauses:

Clause 1. A power tool comprising: a housing including a motor housing portion, a front housing portion, a rear housing portion, and a handle portion extending from the motor housing portion, a motor disposed within the motor housing portion, a trigger located on a front side of the handle portion, a torque adjustment interface for changing a torque setting of the power tool, and a torque setting indicator disposed on a side of the power tool and configured to indicate the torque setting of the power tool.

Clause 2. The power tool of any preceding clause, wherein the torque setting indicator is disposed on the front housing portion.

Clause 3. The power tool of any preceding clause, wherein the torque setting indicator is a set of lights.

Clause 4. The power tool of any preceding clause, wherein the set of lights produce a pattern associated with different torque settings.

Clause 5. The power tool of any preceding clause, wherein the pattern is a flashing pattern associated with at least one torque setting of the power tool.

Clause 6. The power tool of any preceding clause, wherein the pattern is a color changing pattern associated with at least one setting of the power tool.

Clause 7. The power tool of any preceding clause, wherein at least one of the different torque settings is associated with a clutch out of the power tool.

Clause 8. The power tool of any preceding clause, wherein the set of lights is a set of shadowless lights arranged to illuminate a work surface.

Clause 9. The power tool of any preceding clause, wherein the torque setting indicator includes a numerical representation of the torque setting.

Clause 10. The power tool of any preceding clause, wherein the torque setting indicator includes a mode setting.

Clause 11. The power tool of any preceding clause, wherein the torque setting indicator includes a lock indicator.

Clause 12. The power tool of any preceding clause, wherein the torque setting indicator includes a clutch indicator.

Clause 13. The power tool of any preceding clause, wherein the clutch indicator indicates a clutch out condition.

Clause 14. The power tool of any preceding clause, wherein the clutch indicator indicates that the clutch out condition has cleared.

Clause 15. The power tool of any preceding clause, wherein the torque setting indicator includes a gauge for indicating a present state-of-charge of a battery pack for the power tool.

Clause 16. The power tool of any preceding clause, wherein the gauge is an illumination bar.

Clause 17. The power tool of any preceding clause, wherein the torque setting indicator includes a set of lights forming a ring illuminated in different segments associated with different torque settings.

Clause 18. The power tool of any preceding clause, wherein each segment includes a numerical representation of the different torque settings.

Clause 19. The power tool of any preceding clause, further comprising a controller configured to control the motor and connected to the torque setting indicator.

Clause 20. The power tool of any preceding clause, wherein the torque setting indicator includes a set of lights, and the controller is configured to turn the set of lights on or off.

Clause 21. The power tool of any preceding clause, wherein power tool is configured to generate an audible indication associated with a torque setting.

Clause 22. The power tool of any preceding clause, wherein the audible indication is produced by the motor.

Clause 23. The power tool of any preceding clause, wherein the audible indication is produced by a speaker.

Clause 24. The power tool of any preceding clause, wherein the audible indication is associated with a clutch out condition.

Clause 25. The power tool of any preceding clause, further comprising a tactile feedback indicator associated with the torque setting.

Clause 26. The power tool of any preceding clause, wherein the tactile feedback indicator is configured to be activated during a clutch out condition.

Clause 27. The power tool of any preceding clause, wherein the torque setting indicator is disposed on the motor housing portion.

Clause 28. The power tool of any preceding clause, wherein the torque setting indicator is disposed on the rear housing portion.

Clause 29. The power tool of any preceding clause, wherein the torque adjustment interface is rotatable in a first direction to electronically increase the torque setting and in a second direction opposite the first direction to electronically decrease the torque setting.

Clause 30. The power tool of any preceding clause, wherein the torque adjustment interface is a dial assembly including a dial case, a potentiometer, a circuit board, and a support.

Clause 31. The power tool of any preceding clause, wherein the dial case includes a top wall, a central post extending through the top wall, and an outer wall, the top wall and outer wall defining a cavity.

Clause 32. The power tool of any preceding clause, further comprising a block projecting from the top wall and the outer wall into the cavity.

Clause 33. The power tool of any preceding clause, wherein the central post includes a first portion extending from a top surface of the dial case and a second portion extending from a bottom surface of the dial case, and wherein the first portion is cylindrical in shape, and the second portion partially cylindrical with a flat side.

Clause 34. The power tool of any preceding clause, wherein the second portion extends through a central aperture of the potentiometer and a central aperture of the circuit board and is received by a central recess of the support.

Clause 35. The power tool of any preceding clause, wherein the central aperture of the circuit board and the central recess of the support are cylindrical.

Clause 36. The power tool of any preceding clause, wherein the central aperture of the potentiometer is cylindrical with a flat side.

Clause 37. The power tool of any preceding clause, wherein the support includes a plurality of bosses and a stop tab extending from a top surface of the support.

Clause 38. The power tool of any preceding clause, wherein the plurality of bosses are received by apertures in the circuit board to secure the circuit board to the support.

Clause 39. The power tool of any preceding clause, wherein the stop tab extends through a cutout in the circuit board.

Clause 40. The power tool of any preceding clause, further comprising a detent mechanism including a detent housing, a biasing member, and a ball.

Clause 41. The power tool of any preceding clause, wherein the ball is in contact with the outer wall and pushed into the detent housing against the biasing member by the outer wall, and as the dial case is rotated, the ball is pushed different distances into the detent housing.

Clause 42. The power tool of any preceding clause, wherein the outer wall includes a plurality of trough portions and a plurality of ridge portions.

Clause 43. The power tool of any preceding clause, wherein each of the plurality of trough portions is associated with a specific torque setting.

Clause 44. The power tool of any preceding clause, wherein the power tool includes a wireless communication controller.

Clause 45. A power tool comprising a housing including a motor housing portion, a front housing portion, a rear housing portion, and a handle portion extending from the motor housing portion, a motor disposed within the motor housing portion, a trigger located on a front side of the handle portion, a torque adjustment interface disposed between the front housing portion and the trigger for changing a torque setting of the power tool, a torque setting indicator disposed on a side of the power tool and including a set of indicators configured to indicate the torque setting of the power tool, and a controller configured to control the motor and connected to the torque setting indicator.

Clause 46. The power tool of any preceding clause, wherein the set of indicators is configured to produce a light pattern associated with different torque settings.

Clause 47. The power tool of any preceding clause, wherein the pattern is a flashing pattern associated with at least one torque setting of the power tool.

Clause 48. The power tool of any preceding clause, wherein the pattern is a color changing pattern associated with at least one setting of the power tool.

Clause 49. The power tool of any preceding clause, wherein at least one of the different torque settings is associated with a clutch out of the power tool.

Clause 50. The power tool of any preceding clause, wherein the set of indicators is a set of shadowless lights arranged to illuminate a work surface.

Clause 51. A method of operating a power tool, the method comprising: indicating a torque setting of the power tool via a torque setting indicator disposed on a side of the power tool; and alerting a user of a clutch out condition when an electronic clutch of the power tool is engaged.

Clause 52. The method of any preceding clause, wherein indicating the torque setting includes illuminating a set of lights.

Clause 53. The method of any preceding clause, wherein alerting the user includes flashing a set of lights.

Clause 54. The method of any preceding clause, wherein alerting the user includes producing an audible indication.

Clause 55. The method of any preceding clause, wherein alerting the user includes producing a tactile indication.

Clause 56. The method of any preceding clause, further comprising wirelessly controlling the power tool via a tool interface of an external device.

What is claimed is:

1. A power tool comprising:

a housing including a motor housing portion, a front housing portion, a rear housing portion, and a handle portion extending from the motor housing portion;

a motor disposed within the motor housing portion;

a trigger located on a front side of the handle portion;

a torque adjustment interface for changing a torque setting of the power tool; and a torque setting indicator disposed on a side of the power tool and configured to indicate the torque setting of the power tool, wherein the torque setting indicator includes a set of lights forming a ring illuminated in different segments associated with different torque settings.

2. The power tool of claim 1, wherein the set of lights produce a pattern associated with different torque settings.

3. The power tool of claim 2, wherein at least one of the different torque settings is associated with a clutch out of the power tool.

4. The power tool of claim 1, wherein the set of lights is a set of shadowless lights arranged to illuminate a work surface.

5. The power tool of claim 1, wherein the torque setting indicator includes a numerical representation of the torque setting.

6. The power tool of claim 1, wherein the torque setting indicator includes a clutch indicator.

7. The power tool of claim 6, wherein the clutch indicator indicates a clutch out condition.

8. The power tool of claim 7, wherein the clutch indicator indicates that the clutch out condition has cleared.

9. The power tool of claim 1, wherein the torque setting indicator includes a gauge for indicating a present state-of-charge of a battery pack for the power tool.

10. The power tool of claim 1, wherein each segment includes a numerical representation of the different torque settings.

11. The power tool of claim 1, wherein the power tool is configured to generate an audible indication associated with the torque setting.

12. The power tool of claim 1, further comprising a tactile feedback indicator associated with the torque setting.

13. A power tool comprising:

a housing including a motor housing portion, a front housing portion, a rear housing portion, and a handle portion extending from the motor housing portion;

a motor disposed within the motor housing portion;

a trigger located on a front side of the handle portion;

a torque adjustment interface disposed between the front housing portion and the trigger for changing a torque setting of the power tool;

a torque setting indicator disposed on a side of the power tool and including a set of indicators configured to indicate the torque setting of the power tool; and a controller configured to control the motor and connected to the torque setting indicator, wherein the torque setting indicator includes a set of lights forming a ring illuminated in different segments associated with different torque settings.

14. The power tool of claim 13, wherein the set of indicators are configured to produce a light pattern associated with different torque settings.

15. The power tool of claim 14, wherein at least one of the different torque settings is associated with a clutch out of the power tool.

16. A method of operating a power tool, the method comprising:

indicating a torque setting of the power tool via a torque setting indicator disposed on a side of the power tool; and alerting a user of a clutch out condition when an electronic clutch of the power tool is engaged, wherein the torque setting indicator includes a set of lights forming a ring illuminated in different segments associated with different torque settings.

17. The method of claim 16, further comprising wirelessly controlling the power tool via a tool interface of an external device.

* * * * *